Feb. 17, 1959    C. L. SCHULTE ET AL    2,873,613
MAIN SPINDLE DRIVE FOR LATHES AND THE LIKE
Filed Sept. 11, 1956    11 Sheets-Sheet 1
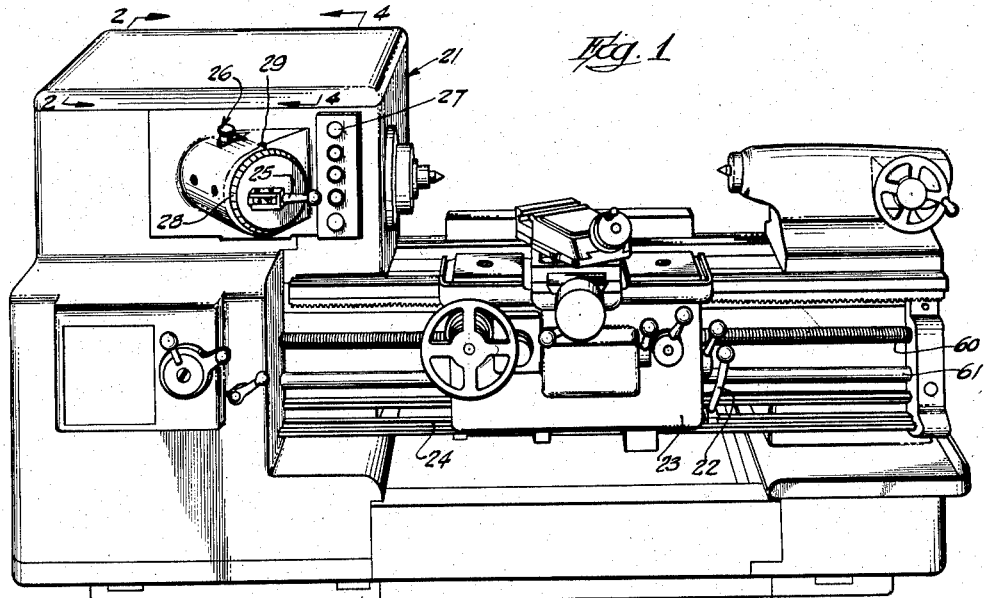
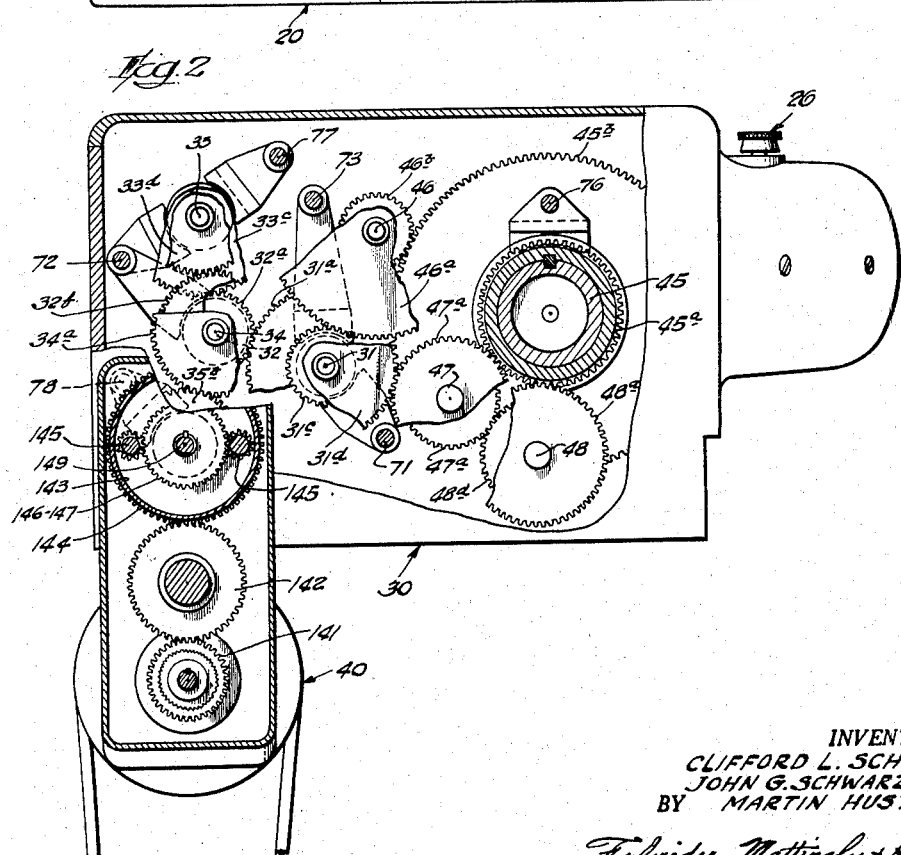
INVENTORS.
CLIFFORD L. SCHULTE
JOHN G. SCHWARZBECK
BY MARTIN HUST
ATTORNEYS.

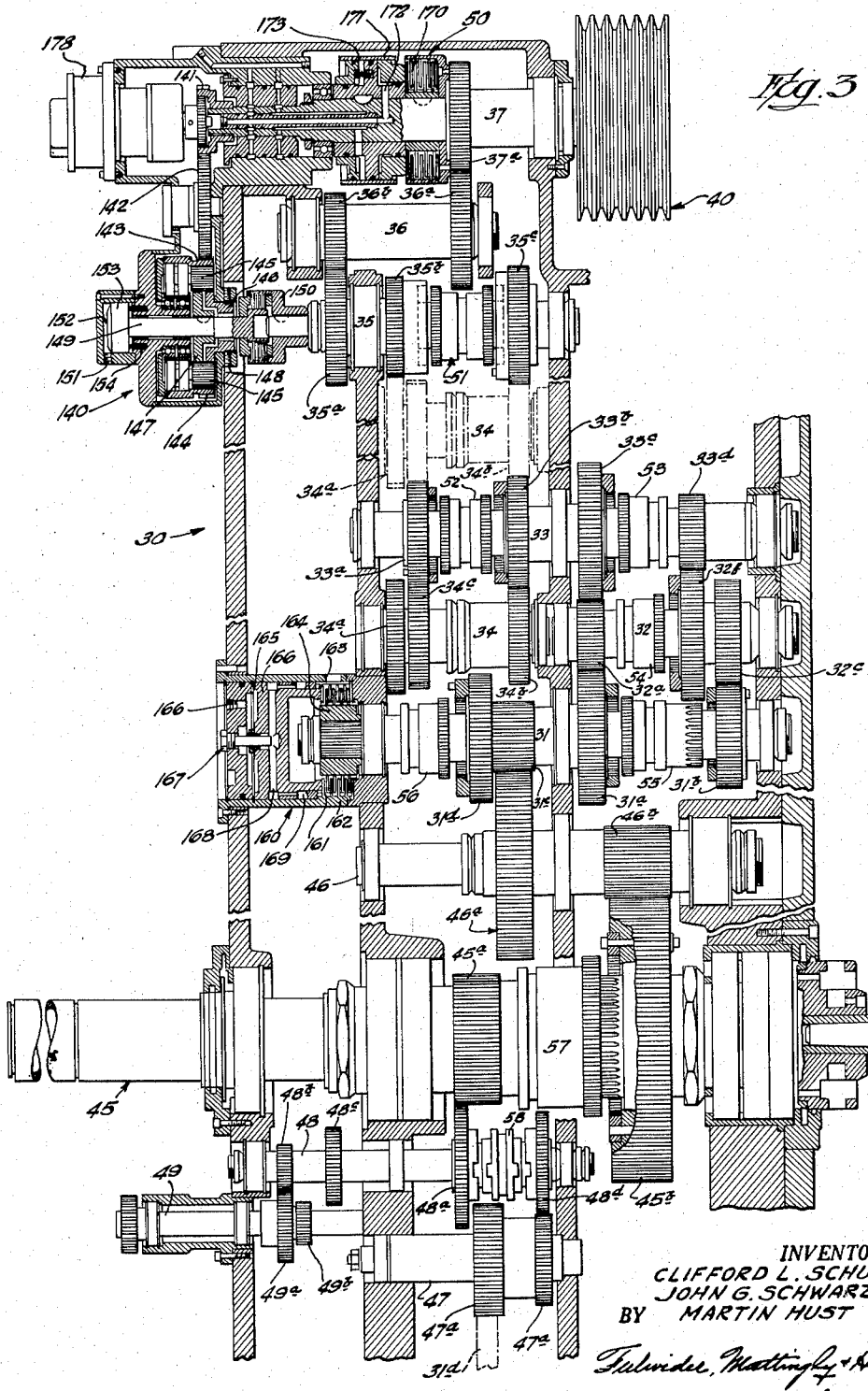

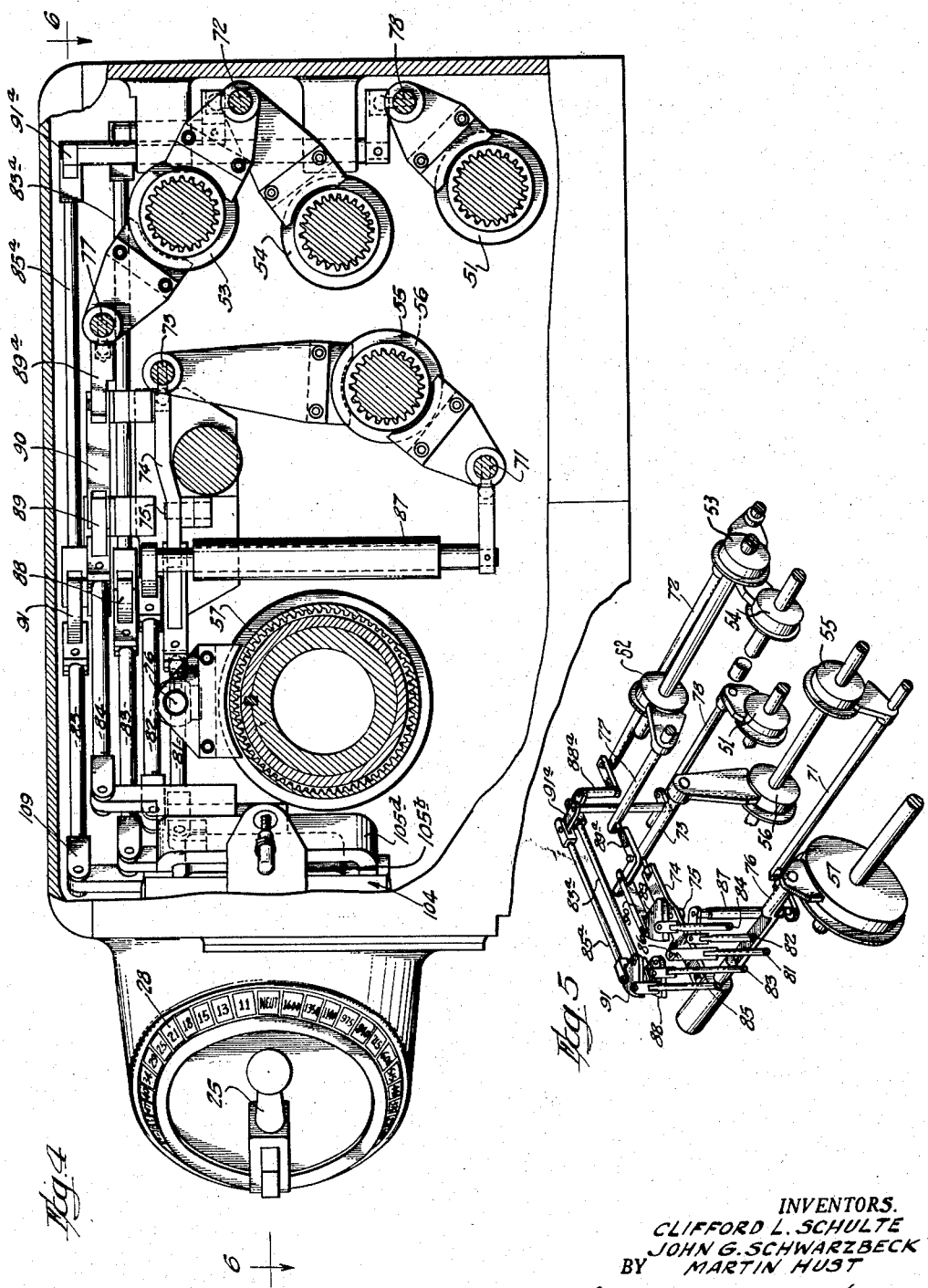

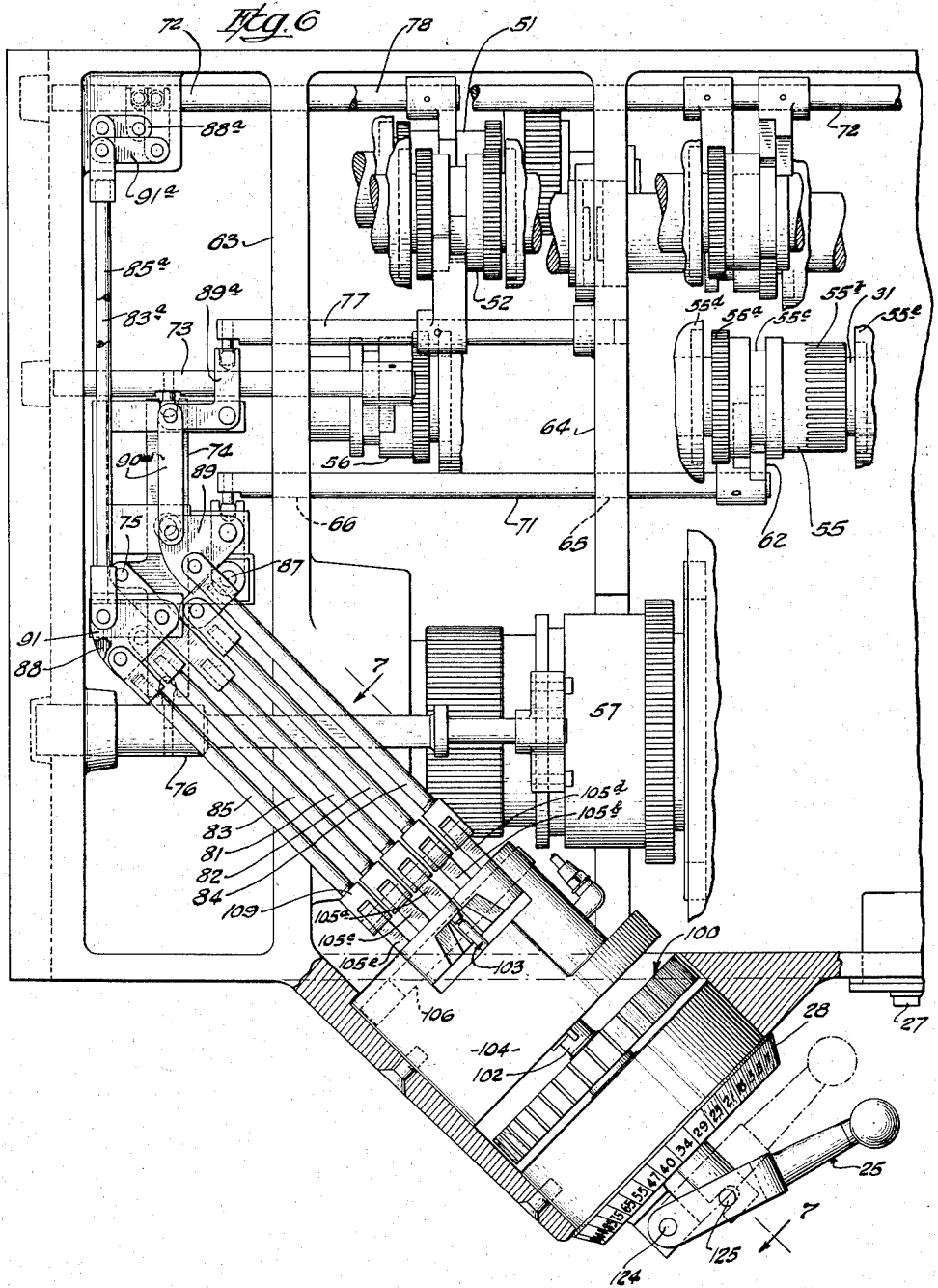

Feb. 17, 1959 C. L. SCHULTE ET AL 2,873,613
MAIN SPINDLE DRIVE FOR LATHES AND THE LIKE
Filed Sept. 11, 1956 11 Sheets-Sheet 5
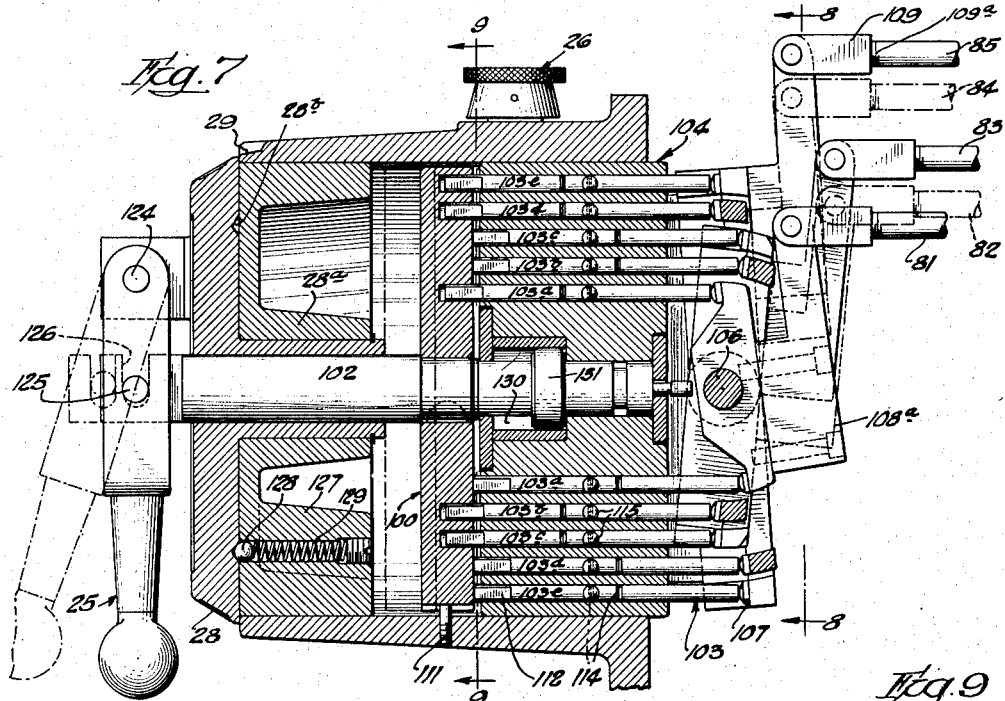
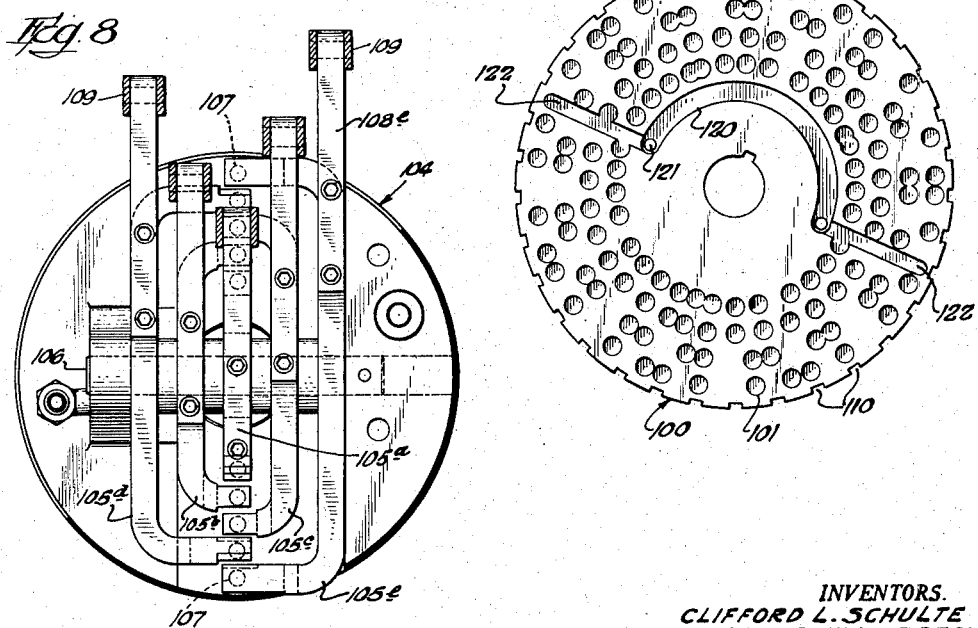
INVENTORS.
CLIFFORD L. SCHULTE
JOHN G. SCHWARZBECK
BY MARTIN HUST
ATTORNEYS.

Feb. 17, 1959  C. L. SCHULTE ET AL  2,873,613
MAIN SPINDLE DRIVE FOR LATHES AND THE LIKE
Filed Sept. 11, 1956  11 Sheets-Sheet 6
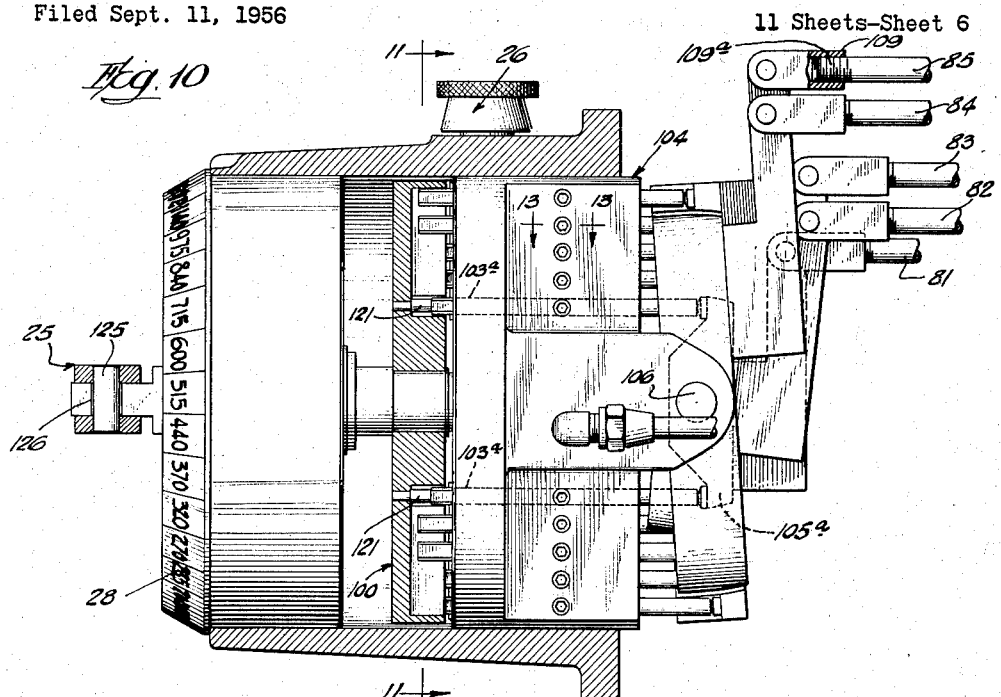
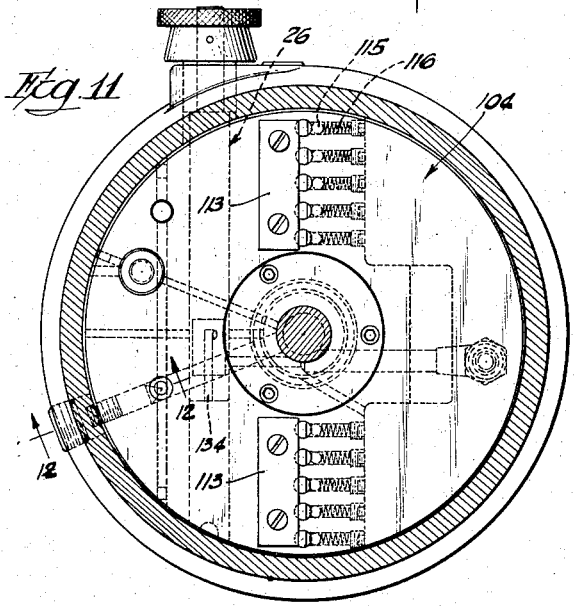
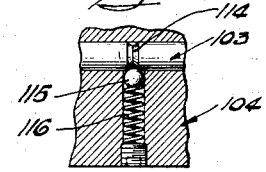
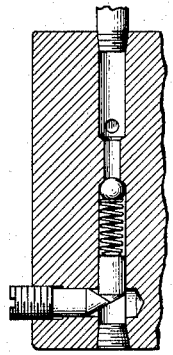
INVENTORS.
CLIFFORD L. SCHULTE
JOHN G. SCHWARZBECK
BY MARTIN HUST
ATTORNEYS.

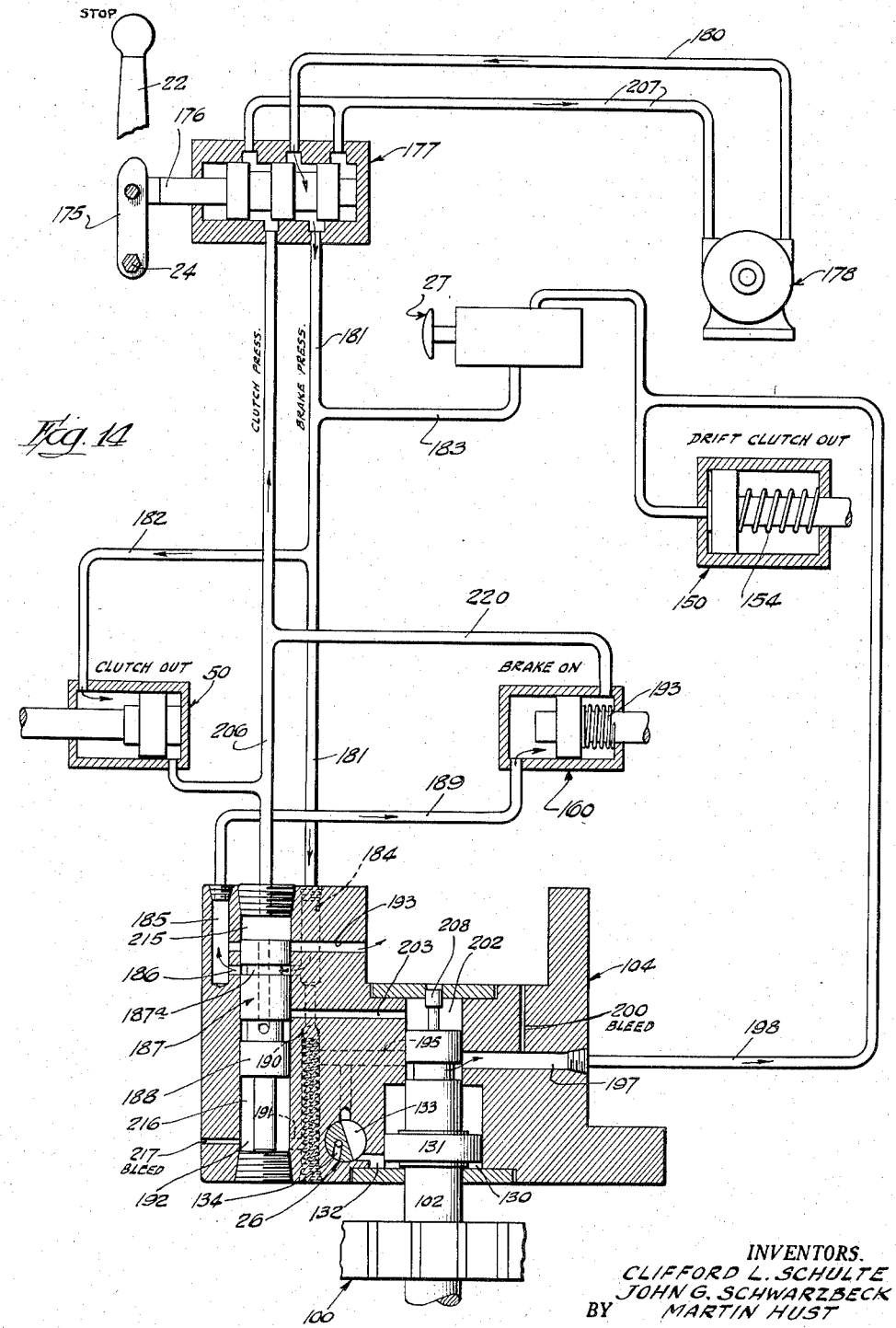

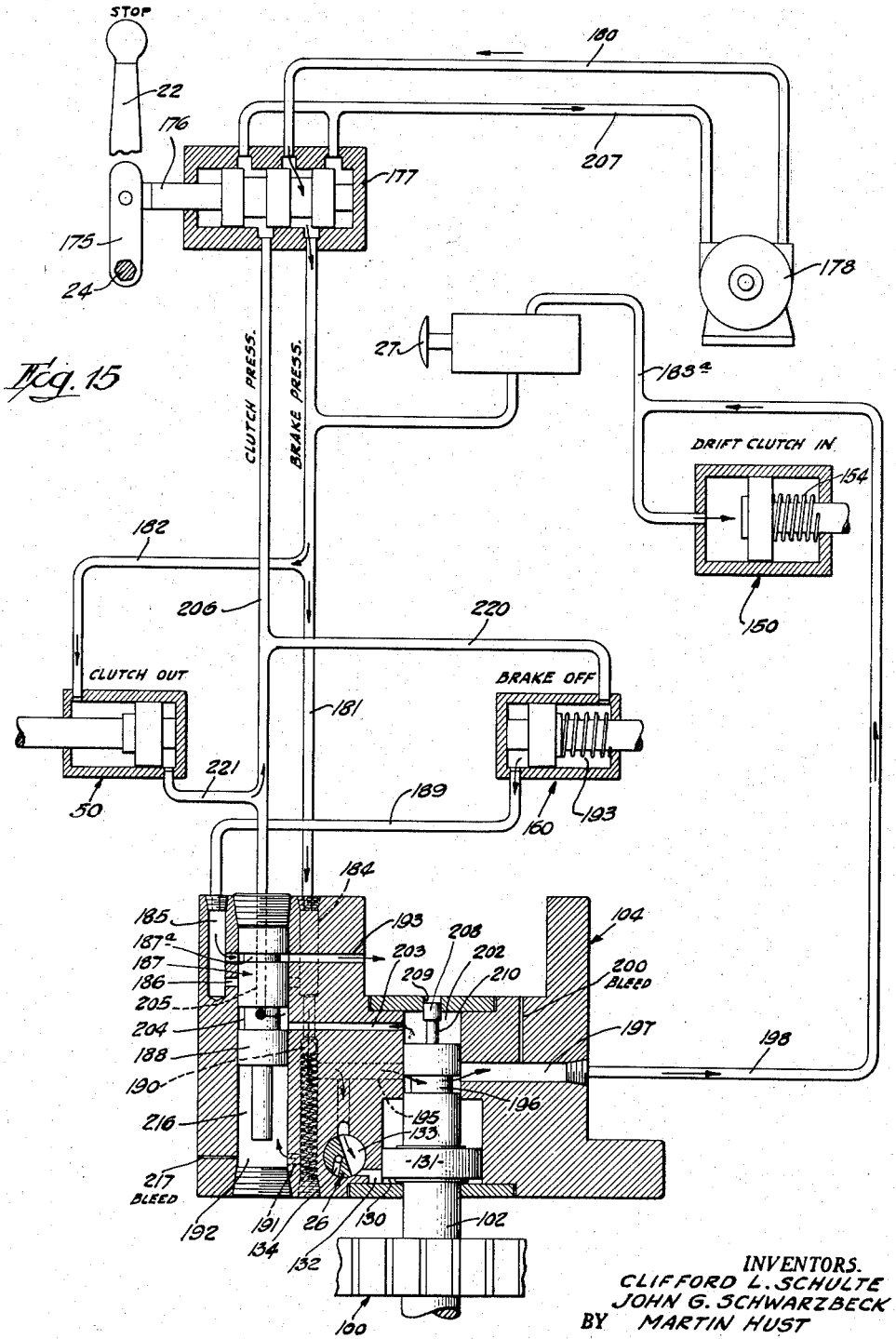

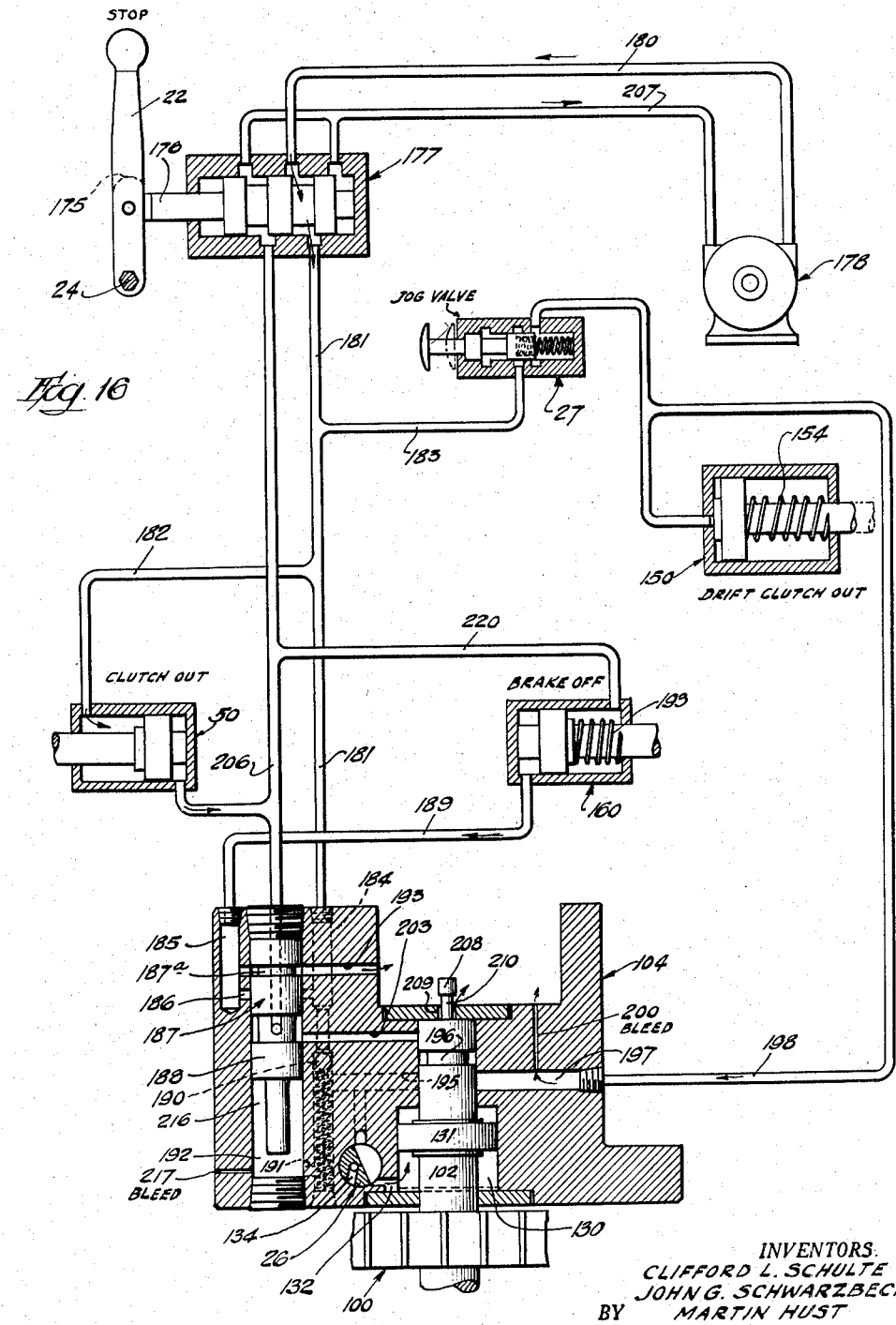

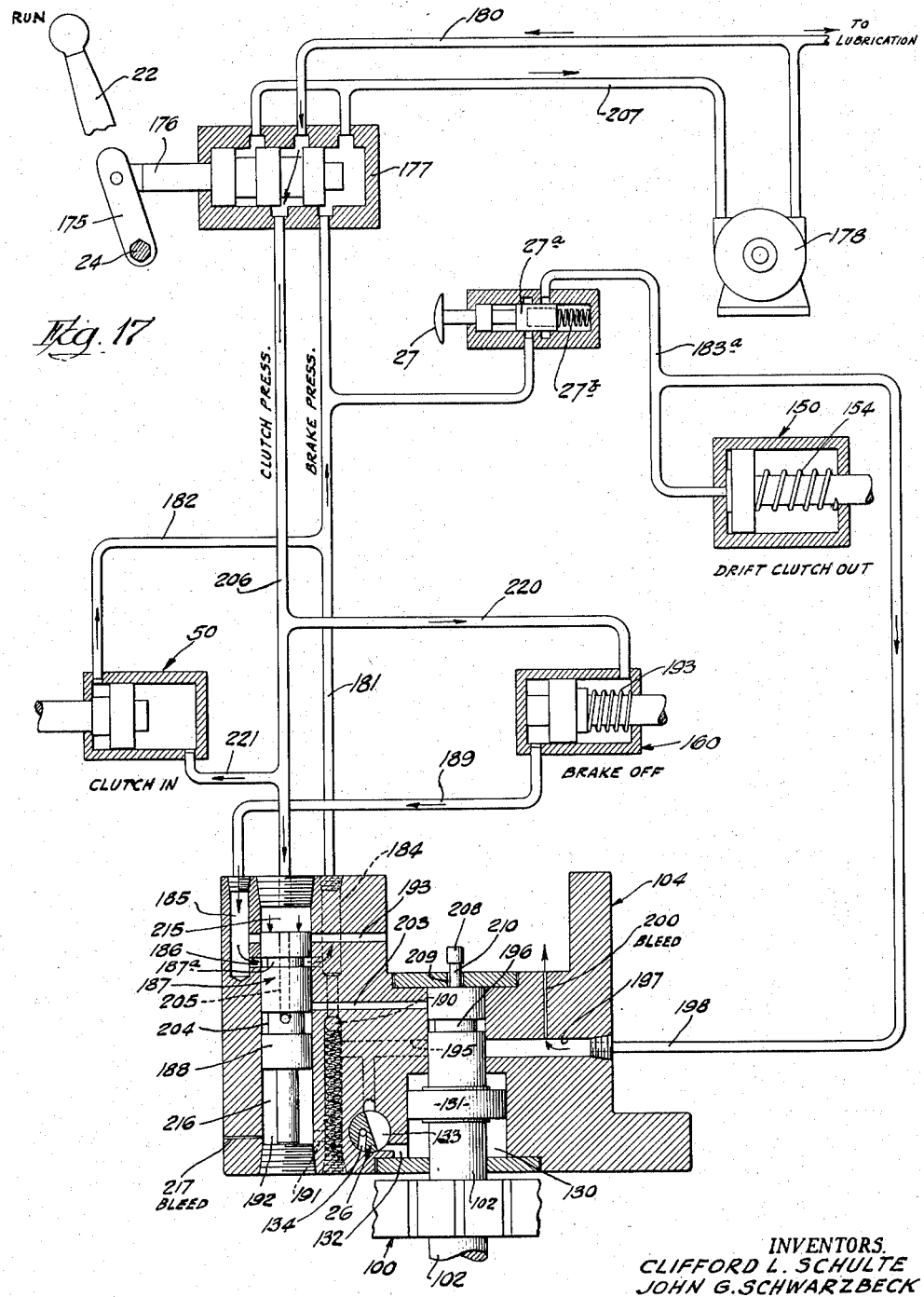

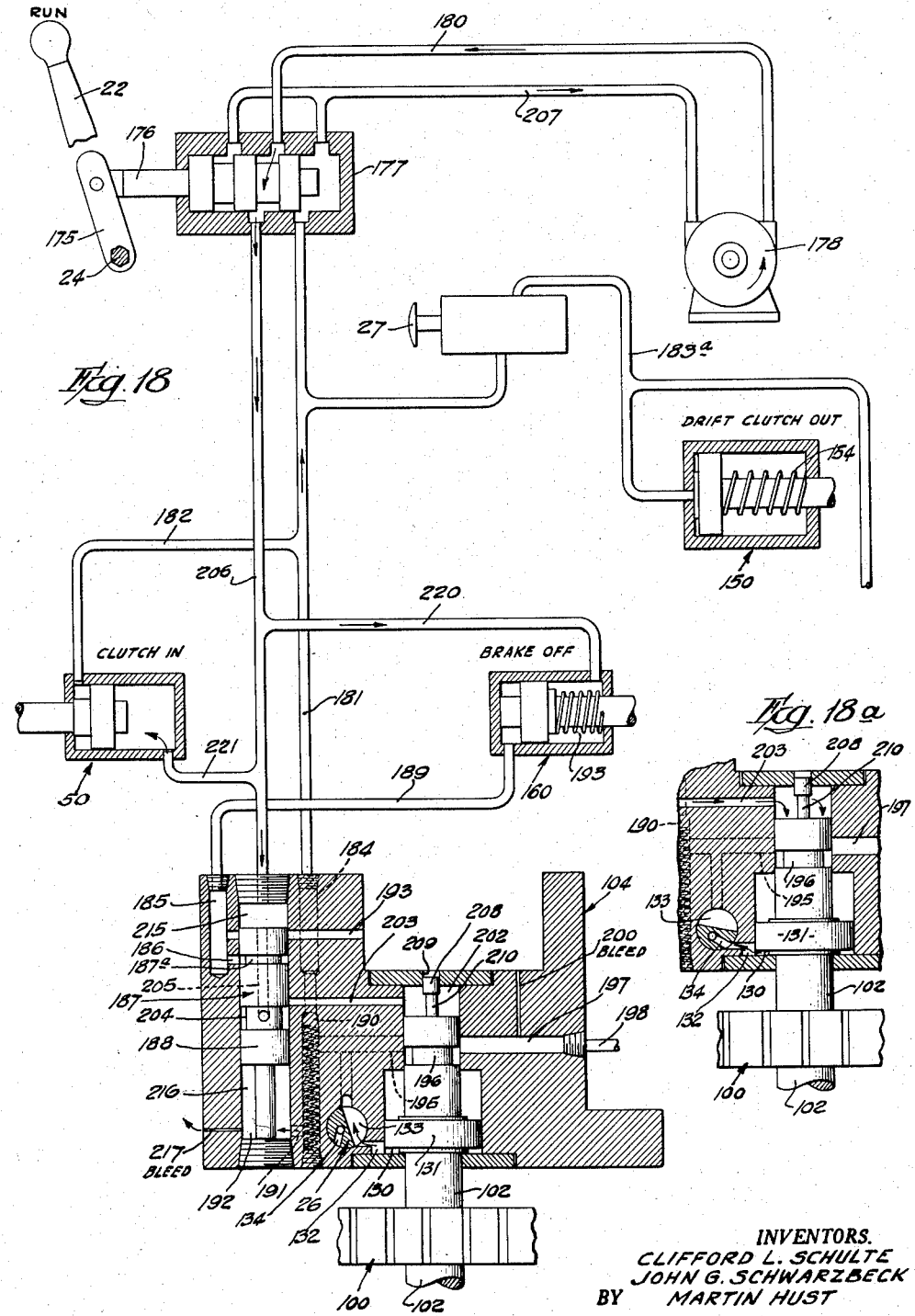

United States Patent Office 2,873,613
Patented Feb. 17, 1959

2,873,613

MAIN SPINDLE DRIVE FOR LATHES AND THE LIKE

Clifford L. Schulte, Bell, John G. Schwarzbeck, South Gate, and Martin Hust, San Gabriel, Calif., assignors to U. S. Industries, Inc., a corporation of Delaware Application September 11, 1956, Serial No. 609,189

38 Claims. (Cl. 74—334)

The present invention relates generally to machine tools, and more particularly to the main spindle drive for lathes and the like, and to the speed-changing transmission and controls therefor. The invention is illustrated hereinafter as embodied in a lathe of the type used for the production of relatively complex and heavy work pieces involving turning, facing, threading to shoulders, and the like. It will be realized, however, that the transmission and controls embodying the present invention may be advantageously employed in other types of machine tools.

One of the problems encountered in the operation of machine tools heretofore available is that of changing the spindle speed during the progress of the work. For example, when a generally cylindrical work piece is to be turned down to a relatively small diameter, shouldered, and turned to a considerably larger diameter adjacent the shoulder, efficient cutting operation necessitates a change in the spindle speed, i. e., the speed at which the work is rotated. The practice heretofore has been to stop the machine when it is desired to change the spindle speed, make the appropriate shifts in a geared transmission to set the same for the new speed, and to again start the machine. Such "shutdown time" considerably decreases the efficiency of the machine, particularly in repetitive operations.

Another problem often encountered in connection with lathes and similar machine tools is that of shifting gears to change the spindle speed, or in shifting positive toothed clutches to achieve the same results. In geared head lathes, for example, having a large number of selective spindle speeds, it is necessary to cause a relatively large number of different clutches or gears having positively meshing teeth to engage; and under such circumstances the teeth often jam or fail to slide into mesh, causing considerable delay in adjusting the transmission to a new speed.

Still another problem arises from the fact that harm may result to the transmission elements if an attempt is made to shift the same while running or while slowing to a stop. In machine tools of the class described heretofore available, an operator in attempting to reduce the "shutdown time" to a minimum may frequently attempt to shift the transmission before the machine has come to a complete stop. Yet, for efficient operation, the shift should be made as soon as the speed of the transmission members has slowed to the point where a shift may be made without damage.

Still another problem frequently encountered in connection with machine tools, particularly lathes of the class described, is that of turning the work piece a few degrees for the purpose of inspecting the same or for the purpose of inserting or removing it from the machine. In large, heavy-duty lathes of the class described, the work piece may often weigh many hundreds of pounds and it is, therefore, difficult to rotate the same manually for the purposes just mentioned.

With the major object of overcoming the difficulties and problems above mentioned, and others, it is a specific object of the present invention to provide a speed-change transmission for machine tools of the class described in which the speed may be changed by first setting the controls to the next desired speed while the machine is still running, and thereafter actuating the speed-change control during a momentary stopping of the spindle to shift the transmission to the new speed.

It is another object of the present invention to provide improved means in a spindle transmission of the class described, for causing the successive engagement of a plurality of toothed clutches whereby to prevent jamming of the same.

It is still another object of the present invention to provide improved means in the spindle control of a machine tool of the class described for preventing the accidental shifting of the speed-change gears at a time when the same is running, or when injury would result to the parts.

It is a further object of the invention to provide improved means in a spindle transmission of the class described for effecting controlled partial rotation of the work piece for the purposes of inspection and removal from the machine.

Yet another object of the invention is to provide a spindle transmission of the class described which may be operated by a single lever to select the next desired speed, and also to shift the change gears to effect such speed.

Yet another object of the invention is to provide means in a spindle transmission of the class described for power assistance in the manual shifting of the speed-change gears.

Still another object of the present invention is to provide automatically operating brake means for rapidly decellerating the spindle, and thereafter leaving the spindle free to turn.

The foregoing and additional objects and advantages in the invention will appear from the description to follow, consideration being given also to the attached drawings in which:

Figure 1 is a front perspective view of a heavy duty screw-cutting lathe embodying the present invention;

Figure 2 is an elevational section taken on the line 2—2 in the Figure 1;

Figure 3 is a developed section taken through the shaft axes of the gears shown in Figure 2 and illustrating the driving arrangement of said gears and other parts of the transmission;

Figure 4 is an elevational section taken on the line 4—4 in Figure 1;

Figure 5 is a fragmentary perspective view of clutch control linkages shown in Figure 4;

Figure 6 is a horizontal section taken on the lines 6—6 in Figure 4;

Figure 7 is an elevational section taken on the line 7—7 in Figure 6;

Figure 8 is an elevational, partially-sectioned view taken on the line 8—8 in Figure 7;

Figure 9 is a fragmentary elevational view taken on the line 9—9 in Figure 7 illustrating an apertured selector plate therein;

Figure 10 is an elevational section similar to Figure 7 with the parts in a different position and with certain of the parts not sectioned, in order to show the exterior configuration thereof;

Figure 11 is an elevational section taken on the line 11—11 in Figure 10;

Figure 12 is an enlarged section taken on the line 12—12 in Figure 11;

Figure 13 is an enlarged fragmentary section taken on the line 13—13 in Figure 10; and Figures 14 through 18a are semi-schematic diagrams of the hydraulic control system and associated mechanical parts included in the transmission illustrated in the previous figures.

In the drawings the reference character 20 identifies a geared head, screw-cutting, tool room lathe embodying the present invention. The spindle transmission elements are all located within a headstock housing 21 having removable portions whereby access may be had to the interior of the housing for the purposes of adjustment or repair. The details of such housing construction being well known and not being a part of the present invention, no further illustration or description is deemed necessary herein.

Controls important to the present invention include a start-stop lever 22 carried on the apron 23a of the conventional carriage 23, which start-stop lever operates through a rock-shaft 24, thus making the stop-start control accessible to an operator standing in front of the carriage apron. Also included in the controls important to the present invention is a single speed-shift lever 25, a manual-automatic, change-over knob 26, and a jog control 27 by which partial rotation of the work piece or spindle may be achieved for the purpose of inspection or the like. The spindle speed to which the machine has been set is indicated on a rotating dial 28, which is read against a fixed index 29. The arrangement, construction, and operation of the foregoing controls will be described in more detail hereinafter.

Referring to Figures 2 and 3, the speed-change transmission is indicated generally by the reference character 30 and will be seen to comprise a plurality of parallel shafts, each of which carries two or more gears meshed with gears on other shafts. The transmission 30 is, generally speaking, a gear reduction, since in most of the arrangements the spindle speed is less than that of the input shaft. However, there are a few arrangements in which the speed transmission is actually a speed increase gear train wherein the spindle speed is greater than that of the input shaft.

The shafts are numbered in the drawings with the numbers 31 through 37, starting with the generally lowest speed (output) shaft and numbering the shafts in the order in which their gears mesh with those on other generally higher speed shafts. The high-speed shaft, or input shaft, 37 carries a multiple sheave 40 which is power-driven in conventional fashion by means of multiple V-belts (not shown).

At the opposite or output end of the gear train comprising the transmission 30, the same is drivingly meshed with a more-or-less conventional spindle assembly comprising a main spindle 45, a back gear shaft 46, and a reverse gear shaft 47, each of the shafts 45, 46, and 47 carrying various gears to be described. Power for operating the lead and feed controls in the carriage apron 23 is derived from the spindle through the various gears mounted on a lead reverse shaft 48 and a lead and feed take-off shaft 49.

All of the gears of the transmission 30 are arranged and mounted to remain constantly in mesh with their respective mating gears, and several of the gears are free (selectively) to turn on their respective shafts. The selective driving engagement through various pairs of mated and meshed gears is accomplished by selectively coupling certain gears to the respective shafts on which such selected gears are mounted.

More specifically, the high-speed drive-shaft 37 carries a gear 37a thereon which may be coupled to, or decoupled from the shaft 37 by means of a multiple disk clutch 50 (herein termed "main clutch") to be described in more detail later herein.

The idler shaft 36 has two gears keyed thereto, one of which 36a is meshed with the drive gear 37a and the other of which 36b is meshed with the next gear in the train, to wit, 35a.

The driven intermediate gear 35a is keyed to the shaft 35, which also carries intermediate gears 35b and 35c, which are each adapted to be selectively coupled to the shaft 35 by means of a toothed double-clutch member 51. The clutch member 51 has a splined connection to the shaft 35 whereby to remain constantly in driving engagement therewith, while at the same time permitting longitudinal movement of the clutch member 51 in either direction along the shaft 35.

The next step in the gear reduction effected by the gear transmission 30 makes use of the gears mounted on the next intermediate shaft 34. Due to the fact that Figure 3 is a developed view of the transmission with all of the shafts placed in the same plane, it is not possible to show the physical location of the shaft 34 while at the same time showing the meshing relationship of its gears with those on the shafts 33 and 34. For this reason, the shaft 34 and the gears thereon are shown both in full line and in phantom line to illustrate the meshing relationship.

All of the intermediate gears on the shaft 34 are keyed thereto and, for reasons that will appear, no clutch is employed on this particular shaft. The shaft 34 may be driven by gears on the adjacent shaft 35 either through the mating and meshing gears 35b and 34a or through the mating and meshing gears 35c and 34b, the selection of such arrangements being dependent upon the position of the clutch member 51 on the shaft 35 which may selectively engage one or the other of the gears 35b or 35c.

The driving rotation of the shaft 34 is transmitted to the next shaft 33 selectively through meshing gears 34c and 33a or through meshing gears 34b and 33b. Selection of the drive arrangements just described is made similarly to that previously described by means of a two-position clutch member 52 mounted on the shaft 33.

In addition to the gears 33a and 33b, which may be either free running or selectively coupled to the shaft 33, the latter shaft also carries a selectively free-running gear 33c and a permanently coupled gear 33d.

The next transmission shaft 32 is driven by gears on the shaft 33 selectively through the meshing pair 33c and 32a or the meshing pair 33d and 32b. The gear 32a is permanently coupled to the shaft 32 while the gear 32b thereon is selectively free-running, being adapted to be coupled to the shaft 32 by means of a clutch member 54. A clutch member 53 on the shaft 33 permits the selective coupling of the shaft 33c to the shaft 33. The two clutch members 53 and 54 are interconnected to operate in unison but in opposite directions, as will hereinafter be described, the clutch member 53 being always disengaged when the clutch member 54 is engaged, and vice versa. Thus it will be seen that when the shaft 33 is coupled to the intermediate gear 33c to effect a driving engagement with the gear 32a, the meshing pair 33d and 32b are ineffective since the gear 32b is then disengaged from, and free-running on the shaft 32.

The drive from the shaft 32 is transmitted to the shaft 31 selectively through one of the meshing pairs of gears 32c and 31b or 32a and 31a. Selection of this engagement is made as previously described by means of a two-positioned clutch member 55.

Powered rotation is transmitted from the shaft 31 to the back gear shaft 46 by the permanently coupled meshing gears 31c and 46a. Alternatively the rotation of the shaft 31 may be transmitted to the spindle 45 through a selectively driven gear 31d which meshes through an idler gear 47a with a permanently coupled gear 45a on the spindle. Again, the fact that Figure 3 is a developed view, necessitates a double showing of the gear 31d. The intermediate gear 31d on shaft 31 is selectively coupled to, or decoupled from the shaft by means of a clutch member 56.

Relatively slow-speed, high-torque drive of the spindle 45 is effected through the back gear assembly mounted on the shaft 46. The latter is continuously rotated through the driven gear 46a, which rotation is transmitted to the spindle through a drive pinion 46b meshing with a selectively free-running gear 45b on the spindle. The gear 45b may be coupled to the spindle selectively by means of a clutch member 57. The clutch member 57 on the spindle 45 and the clutch member 56 on the shaft 31 are interconnected for simultaneous operation whereby the clutch member 56 is always disengaged when the clutch member 57 is engaged, and vice versa. The means for effecting this simultaneous operation will be described in more detail hereinafter.

Power to rotate the lead screw 60 (see Figure 1) and the feed shaft 61 is derived from the spindle through a gear train mounted on the shafts 47, 48, and 49. Rotation of the feed and lead members in a forward direction is accomplished through the meshing of the spindle gear 45a with a gear 48a on the shaft 48 and a further meshing of a permanently coupled gear 48b with a gear 49a on the shaft 49. The gear 49a is formed as a common part of a second gear 49b and these two gears together have a splined connection with the shaft 49 so that they may be shifted as a unit to disengage the larger gear 49a from its driving mate 48b, and at the same time engage the smaller gear 49b with a larger driving gear 48c on the shaft 48. Thus, with a given spindle speed, two speeds of rotation of the lead screw 60 and the feed shaft 61 are more or less conventional and no further description thereof is deemed necessary herein.

When it is desired to reverse the direction of rotation of the lead screw and feed shaft with respect to the spindle, this may be accomplished by means of a reverse idler gear 47a which meshes with a gear 48b on the shaft 48. Selective coupling of the shaft 48 to either of the gears 48a or 48b is accomplished by means of a two-position clutch 58.

In order to assure that the lead screw 60 in the feed screw 51 when disengaged and thereafter re-engaged by the operation of the clutch 58, are re-engaged in the same rotative position, the clutch 58 is constructed with a single mating tooth and complementary cavity so that the clutch will always be engaged with the two parts in the same relative rotational positions.

As thus far described, it will be seen that the transmission 30 is capable of a substantial number of different ratios of speed reduction and increase, depending upon the arrangement of the various clutch members 51 through 57. To recapitulate, the clutch member 51 may be moved to either of two selective positions; the clutch member 52 may be moved to either of two selective positions; the clutch members 53 and 54, operating in unison may be moved to either of two positions; the clutch member 55 may be moved to either of two positions; and the two clutch members 56 and 57, operating in unison, may be moved to either of two driving positions. As will be later described in more detail, the two clutch members 56 and 57, operating in unison, may be moved to a third intermediate position wherein neither clutch member is engaged. The latter arrangement leaves the spindle free to turn.

From the foregoing, it will be seen that by manipulating the clutches 51 through 57 to the various possible positions thereof, a total of 32 possible spindle speeds may be obtained for a given speed of the input shaft 37. An additional condition of the spindle is the disengaged position, above described, wherein the spindle may be turned by hand to inspect work therein or for the purpose of installing or removing work held thereby.

Conventional means (not shown) are provided for reversing the drive motor whereby each of the 32 speeds above-mentioned may be had in either a forward or reverse direction.

The construction of the various clutches and the means for operating the same are illustrated in Figures 4, 5, and 6; and, being substantially the same in each case, a description of one suffices for all. Referring to Figure 6, it will be seen that the clutch member 55 on the shaft 31 consists of a generally cylindrical body having concentric spur gear portions 55a and 55b formed at its opposite ends. Intermediate the ends of the body is formed a peripheral groove 55c which receives an operating yoke 62. Each of the spur gear portions 55a and 55b is adapted to enter a complemental internal ring gear 55d and 55e, respectively, the ring gears being concentrically secured to the faces of the respective adjacent gears 31a and 31b (see Figure 3).

As previously mentioned, the body of each clutch member has a splined connection with the respective shaft on which it is carried whereby it may be moved longitudinally. Thus, the clutch member 55, for example, may be moved longitudinally in one direction or the other whereby to cause the spur gear portion 55 to enter into locking engagement in the ring gear 55d or alternatively to cause the spur gear portion 55b to enter into locking engagement in the ring gear 55e.

The movement of the various clutch members is effected by means of their respective yokes engaged in the peripheral groove therein, for example, the yoke 62 engaged in the groove 55c.

Movement of the yokes is effected by means of pushrods slidably mounted in suitable apertures in housing members 63 and 64. For example, the pushrod 71 carries the yoke 62 on the outer end thereof and is mounted in slide bearings 65 and 66 in the housing members 63 and 64.

In a similar fashion a pushrod 72 carries yokes to operate the clutches 53 and 54, which it will be remembered operate in unison; a pushrod 73 operates the clutch member 56, and through the linkage of rocker arm 74 fulcrumed at a fixed fulcrum 75, also moves a pushrod 76 which through a suitable yoke operates the spindle clutch 57. A pushrod 77 actuates the clutch member 52 and a pushrod 78 actuates the clutch member 51.

The longitudinal clutch-shifting movements of the pushrods 71, 72, 73, 76, 77, and 78 are all under the control of five connecting rods 81 through 85. The connecting rod 81 connects by means of a clevis 86 to a pivot point on the rocking link 76 and thus moves the pushrods 73 and 76; the connecting rod 82 connects through a bell crank 87 to the pushrod 71; the connecting rod 83 connects through a bell crank 88, a second connecting rod 83a, and a second bell crank 88a to the pushrod 72; the connecting rod 84 connects through a bell crank 89, a link 90, and a second bell crank 89a to the pushrod 77; and connecting rod 85 connects through a bell crank 91, a second connecting rod 85a, and a second bell crank 91a to the pushrod 78.

From the foregoing it will be seen that the various clutches are adjusted to their positions by either pushing or pulling on the various connecting rods 81 through 85. The mechanism and controls for effecting this pushing and pulling movement are shown in Figures 7 through 9. The movement of the connecting rods 81 through 85 is effected, through a linkage to be described, by axial movement of a selector plate 100 having a pattern of apertures 101 in the front face thereof (see Figure 9).

As can be seen in Figure 7, the selector plate 100 is mounted on a rotatably and slidably supported shaft 102, whereby it is movable axially with the shaft 102 between the positions shown in full and phantom line in Figure 7. Forward axial movement of the plate 100 to the position shown in full line in Figure 7 engages the front face with a row of selector pins 103 arranged in a row disposed diametrically of the selector plate 100 and each mounted for independent axial movement in a pin-bearing body 104.

The pins 103 may be conveniently considered in pairs, one pin of each pair being above the shaft 102 and the other pin of such pair being below the shaft 102, as viewed in Figure 7. The two pins of each pair are equidistant from the axis of the shaft 102 and are designated with the same reference character in the drawings, i. e., the pair closest to the shaft 102 being designated 103a, the next distant pair being designated 103b, etc.

Each of the pairs of pins, 103a through 103e, is arranged to effect rocking movement of one of a group of arms 105 adjacent the outer ends (to the right in Figure 7) of the pins. There are five rocker arms, designated 105a through 105e and all are mounted on a common transverse rock shaft 106. Each of the rocker arms is provided with a pair of pressure receiving buttons 107 adjacent its opposite ends and positioned to contact the outer ends of the pins 103. As can be seen in Figure 8, some of the rocker arms are constructed in a generally C shape so as to bring the buttons 107 into a diametrically disposed line to engage the pins 103.

The pair of pins 103a engages the opposite ends of the rocker arm 105a, the pair of pins 103b engages the ends of rocker arm 105b, etc. From the foregoing it will be seen that by moving one pin of a given pair outwardly while permitting the other pin of the pair to move inwardly, the rocker arm engaged by such pair will be rocked in one direction and vice versa.

The respective rocker arms 105a through 105e are each provided with an upward extension 108a through 108e, and each extension is fastened by means of a clevis 109 to one of the previously described pushrods 81 through 85. Thus the motion of the respective rocker arms is transmitted to the pushrods 81 through 85 as follows: Rocking of the rocker arm 105a reciprocates the pushrod 81; rocking of the rocker arm 105b reciprocates the pushrod 82; rocking of the rocker arm 105c reciprocates the pushrod 83; rocking of the rocker arm 105d reciprocates the pushrod 84; and rocking of the rocker arm 105e reciprocates the pushrod 85.

As can be seen in Figure 9, the pattern of apertures 101 in the front of the plate 100 is such that for every point at which there is an aperture, the diametrically opposite point in the plate is solid. By turning the plate 100 to its various rotational positions or stations, different patterns of apertures and solid portions are presented to the row of pins 103. Thus it will be seen, that when the plate 100 is translated to the right in Figure 7, one pin of each pair is moved to the right and the other pin in said pair is permitted to move to the left, due to the rocking movement of the respective rocker arms. The various permutations of movements of the pushrods 81 through 85 and, hence, the various gear arrangements in the transmission 30 are effected by turning the plate 100 to select an appropriate pattern of apertures 101. In order that the selected pattern will exactly align with the diametric row of pins 103 for any given station of the plate 100, the latter is provided with a plurality of peripheral grooves 110, one of which must engage a fixed pin 111 before the plate may be translated axially. Also, to facilitate the free movement of the plate and the free movement of the pins into the appropriate apertures 101, the left-hand ends of the pins are flattened slightly on opposite sides as indicated at 112 so that a slight deviation of the plate 100 from its proper rotational position will not cause the pins to bind in apertures 101. The flattened portions 112 are maintained in their proper orientation by a plate 113 secured to the face of the pin body 104 (see Figure 11) and bearing against the flattened side of the respective pins.

The rotation and translation of the shaft 102 and the plate 100 is effected by the single control lever 25 pivotally secured at 124 to the indicator dial 28. The pivot end of the lever 25 is bifurcated and passed over the end of the shaft 102 to which it is linked by a cross pin 125 which passes through a transverse slot 126 in the shaft 102. Thus, the shaft 102 may be translated axially by pulling in and out on the lever 25 and may be rotated by rotating the lever 25, which also rotates the dial 28. The dial 28 is supported on an axial bushing portion 28a which is rotatably secured in a fixed bearing member 127. A detent 128 urged by a compression spring 129 engages depressions 28b to yieldably retain the dial in any position to which it has been turned.

In order to retain the various pins and rocker arms in the positions to which they have been moved, even after the plate 100 has been pulled away from the pins, each pin is provided with a pair of detent grooves 114 (see Figures 7 and 13) which grooves are engaged by conventional ball detents 115 mounted in the pin body 104 and urged toward the respective pins by compression springs 116.

As can be seen from the foregoing description, the spindle clutch 57 and the intermediate clutch member 56 operate in unison under the control of the rocker arm 105a and, hence, the pin pair 103a. It will be remembered that the just-mentioned pair of clutches are to have three possible positions, i. e., one in which the spindle clutch is engaged and the intermediate clutch 56 disengaged; the reverse of that condition; and a third position in which both clutches are disengaged. To effect these three possible conditions, the plate 100 is formed with a semi-circular recess 120 which is positioned at the appropriate distance to engage one of the pins of the pair 103a during substantially one-half revolution of the plate 100 and to engage the other pin of such pair during the other half of such revolution. At one point in the revolution of the plate 100, the opposite ends of the semi-circular groove 102 underlie both of the pins in the pair 103a, and at this point a pair of abutments 121, having the effect of reducing the depth of the recess 102 to one-half, are positioned at the ends of the recess 120. The effect of this arrangement can be seen in Figure 10 where it will be seen that the rocker arm 105a has been rocked to an intermediate position due to the fact that the pins 103a are resting on the abutments 121. Inasmuch as this condition frees the spindle for independent manual rotation, it is unnecessary to adjust the remaining pins and rocker arms to any particular positions, and for this reason radial recesses 122 are formed in the plate 100 so as not to disturb the arrangement of the remaining pins when the pin pair 103a is moved to the intermediate position by means of the abutments 121.

As previously stated, it is one of the objects of the present invention to provide power assistance in the selection of the gear arrangement in the transmission 30. Such power assistance in the present invention is hydraulic and is accomplished by means of an hydraulic motor consisting in a cylindrical cavity 130 coaxially surrounding the shaft 102 and a piston 131 moving in the cavity 130. Introduction of hydraulic fluid under pressure to the left of piston 131 (Figure 7) it will be seen, moves the shaft 102 to the right carrying with it the plate 100 and automatically effecting the transmission shift previously described.

Pressurized fluid to actuate the piston 131 is supplied through a passageway 132 (Figure 14) under the control of the manual-automatic shift control valve 26. The valve 26 is a cylindrical plug valve having a cutaway portion 133 to permit passage of pressurized fluid into the passageway 132 when the valve is in the position shown in Figure 14; the plug valve also having a transverse and axial passageway 134 which may be turned to align with the passageway 132 so as to release fluid from the power chamber below the piston 131 when the control valve 26 is turned to "manual" position, as is shown in Figure 18a. As can be seen in Figure 11, the passageway 134 discharges from the bottom of the plug valve 26 and into a sump (not shown). Thus trapped fluid in the cavity 130 will not interfere with the manual operation of the transmission shift control.

Before proceeding to a description of the hydraulic control system, it is well to have in mind the remaining elements that contribute to the operation of the transmission shift. One of these elements important to the proper operation of the transmission shift is the "drift" mechanism and associated controls.

The purpose of the drift mechanism is to "drift," i. e., to slowly rotate the transmission elements during the shifting of the various clutches whereby to prevent the latter from jamming due to the clutch teeth striking head on. The drift mechanism is illustrated in Figure 3 and indicated generally by the reference character 140. Power to drift the transmission gears is derived from the primary drive shaft 37 through a spur gear 141 secured to the left end thereof which meshes through an idler gear 142 with an external spur gear 143 of the drift mechanism. The spur gear 143 is also formed with an internal ring gear portion which meshes with planetary gears 145, the latter in turn meshing with two sun gears 146 and 147. One of the sun gears 146 is fixed against rotation by a set screw 148 while the other sun gear 147 is keyed to a central shaft 149 of the drift mechanism. The number of teeth in the gears 146 and 147 differs by one tooth, whereby a very large speed reduction is effected as between the primary drive shaft 37 and the drift shaft 149.

Means in the form of a conventional multiple disk clutch 150 (herein termed "drift clutch") are provided for selectively coupling the drift shaft 149 to the intermediate transmission shaft 35. The drift clutch 150 is adapted to be engaged hydraulically by introducing pressurized fluid at a connection 151 into a chamber 152 whereby to move a piston 153 to the right (in Figure 3) applying pressure through the shaft 149 to engage the drift clutch 150. When pressure fluid is released from the chamber 152, retracting springs 154 move the piston 153 to the left releasing or disengaging the drift clutch 150.

It will be realized that in order for the drift motion above described to be effective, one of the two members of each of the transmission clutches must be in motion at the exact instant that the clutch is engaged. For this reason it is necessary that the drift motion be successively transmitted from one shaft to the next. In order that this successive transfer of drift motion from one shaft to the next be accomplished, it is necessary that the clutches engage in a predetermined order, to wit, first, clutch No. 51 must engage, then clutch 52 and 53 (simulataneously), then clutch 54, then clutch 55, etc. To accomplish this successive engagement of clutches, the effective lengths of the pushrods 81 through 85 are adjusted as by means of the threaded connection shown at 109a in Figure 10. Thus, each time the selector plate is moved into contact with the selector pins, the clutches operate in the order above-named and, thus, any clutch as it is engaged has one of its complemental members in motion whereby to prevent the jamming previously described.

Another of the important features in the present transmission system is the meanss for quickly decelerating the spindle at the time a transmission shift is contemplated. This means consists in a multiple disk brake indicated generally at 160 in Figure 3. The brake 160 includes a plurality of stationary disks 161 formed with external tabs received in longitudinal key-ways in a fixed housing 162. Interleaved with the stationary disks 161 are rotating disks 163 which have internal tabs received in keyway formed in a bushing 164 secured to the left-hand end of the intermediate shaft 31.

Thus, it will be seen that when the disks 161 and 163 are forced together into frictional face-to-face engagement, braking resistance is applied through the shaft 31 and the intermeshing gears to the spindle 57.

Releasing springs in the form of circular "marcel" type springs are provided between the disks 161 and 163 so as to separate the same when braking pressure is removed. The use of such releasing springs being conventional practice in the construction of multiple disk brakes and clutches, the same are not illustrated or described in further detail herein.

Braking pressure is applied hydraulically by introducing hydraulic fluid into a pressure chamber 165 whereby to force a piston 156 to the right, forcing the disks 161 and 163 into the aforesaid face-to-face friction contact. Fluid to actuate the brake is admitted through a fluid connection 166.

For reasons that will appear, it is desired to release the brake promptly when the need for deceleration has ceased. To this end a second fluid connection 167 is provided by which fluid may be introduced through a passageway 168 to the right of the piston 166, i. e., into a fluid chamber 169 whereby to move the piston 166 to the left and release the brake.

In addition to the hydraulically actuated elements above-described, the transmission includes the previously mentioned main clutch 50 located on the main drive shaft 37. The main clutch 50 includes a plurality of clutch plates similar in construction and arrangement to those described in connection with the clutch 150 and the brake 160. The multiple plates 170 of the main clutch 50 are forced together into driving engagement by means of an annular plunger assembly 171 which is movable to the right to engage the clutch by introducing pressurized fluid through the passageway 172 and is moved to the left to disengage the main clutch 50 by the introduction of pressurized fluid into the back chamber 173 of the plunger assembly 171.

Inasmuch as the detailed construction of hydraulically actuated clutches is known in the art, and is not per se a part of the present invention, no further detailed description is deemed necessary herein.

Still another element which contributes to the operation of the device is the so-called jog valve or jog control 27 which operates to effect small degrees of rotation of the spindle for purposes of inspection and the like. The jog valve 27 consists, as can be seen in Figure 16, in a simple two-way spool valve by which it is possible manually to by-pass other controls and deliver pressure fluid to the drift clutch in a manner to be described in more detail hereinafter.

The primary control for stopping and starting the spindle is, as previously mentioned, the stop-start lever 22. The lever 22 is mounted on a rocker shaft 24 which, in turn, actuates a control lever 175 connected to the plunger 176 of a four-way spool valve 177 located in the housing 21.

The spool-valve 177 controls the delivery of pressurized fluid from a high-pressure pump 178, which is mounted coaxially with the main shaft 37 and continuously rotated thereby. In this connection it should be noted that the pump 178 is driven continuously whether the main clutch 50 is engaged or not.

Having in mind the foregoing hydraulic elements, the interconnection and operation thereof will now be described in conjunction with Figures 14, 15, 16, 17, and 18. First referring to Figure 14, it will be seen that the control elements are shown in the "stop" position, and that the changeover control 26 has been turned to the automatic position, i. e., that in which the cutaway portion 133 permits fluid to pass through the passageway 132.

As will appear from the description to follow, the condition shown in Figure 14 is that of the elements immediately after the lever 22 has been moved to "stop" position. Certain automatic operations of the hydraulic elements illustrated in the lower part of Figure 14 have not as yet taken place, but will take place automatically as will be described.

With the controls in the condition just described, it will be seen that pressurized fluid from the pump 178 is communicated through a passageway 180, the spool valve 177, and a passageway 181, and branch passageways 182 and 183 to the main clutch 50 and the jog control valve 27, respectively. Pressurized fluid is also delivered through the passageway 181 to the pin body 104 in which various hydraulic controls are located, as previously described.

In the body 104 are formed two parallel passageways 184 and 195 (among others) which are interconnected by a transverse passageway 186. Interposed in the transverse passageway 186 is a pilot valve 187, having a circumferential recess 187a, the function of which is to selectively open or interrupt the transverse passageway 186 by vertical movement of the pilot valve spool 188. As shown in Figure 14, the transverse passageway 186 is open, thus permitting pressurized fluid to pass from the conduit 181 through the passageways 184, 186, 185, and the conduit 189 to the brake 160.

As can be seen in Figure 14, the application of pressurized fluid as just described moves the brake to the "on" position. As will be described, the brake remains "on" only momentarily, and for a sufficient time to bring the spindle to a stop; whereupon the brake then releases, permitting subsequent operations to be described.

Turning now to Figure 15, the condition of the mechanism immediately following the application of the brake may be seen. It will be appreciated that as soon as the brake reaches a full "on" position, i. e., one in which the disks 163 are in tight frictional contact with each other, the back pressure in the conduit 189 will build up. As soon as this back pressure builds up to a predetermined value in the conduit 89 and, of course, the conduit 181 as well, a spring-loaded check or relief valve 190 opens permitting the fluid to pass downwardly through the passageway 186 and opening an upper transverse passageway 193 whereby to release fluid from the conduit 189 and permitting the brake to release. For purposes of illustration, the release force on the brake 160 is illustrated schematically in Figures 14 through 18 as a spring 193.

The spring pressure which closes the valve 190 is so adjusted that the valve opens as the pressure in the conduit 181 rises to a sufficient value to apply the brake and disengage the clutch. When these operations have been accomplished, the pressure available to actuate the selector piston 131 is considerably higher.

When the relief valve 190 opens, fluid is also permitted to pass transversely through a passageway 195, a recess 196 in the shaft 102, a passageway 197, and a conduit 198 to the drift clutch 150. As can be seen in Figure 15, application of fluid in the manner just described engages the drift clutch, thus causing the transmission shaft 35 to rotate slowly to facilitate engagement of the toothed transmission clutches.

It will also be observed that the opening of the valve 190 permits fluid to pass through the cutaway portion 133 of the plug valve and the passageway 132 into the chamber 130 below the plunger 131.

As can be seen by reference to Figure 16, the application of pressure fluid in the chamber 130 forces plunger 131 upwardly engaging the selective toothed transmission clutches, as previously described. It will also be seen that the upward movement of the plunger 131, and with it the shaft 102, moves the recess 196 out of alignment with the passageways 195 and 197, whereby to interrupt the delivery of pressure fluid through the conduit 198 to the drift clutch. A bleed passageway 200, connecting the passageway 197 to the external fluid sump, permits the release of fluid from the drift clutch, permitting the same to disengage under the force of the spring 154 (shown schematically in Figure 15). It will be understood that the bleed passage 200 is sufficiently small so that while pressurized fluid is being delivered to the passageway 197 it cannot escape through the passageway 200 at a sufficient rate to prevent delivery of fluid to the drift clutch, as previously described. As soon as the movement of the recess 196 interrupts the delivery of fluid through the passageways 195, 197, and 198 to the drift clutch, the same is released, or disengaged due to the escape of fluid through the bleed passageway 200. Thus, the drift movement stops substantially as soon as all of the clutches are engaged and drift motion is no longer required.

It will be appreciated that, if the selector plate has been moved inwardly so as to arrange the transmission clutches in a certain desired arrangement for a certain desired speed, at the time the spindle is stopped no movement of the drift mechanism is needed or desired. This desirable operational condition is achieved by the fact that the recess 196 is out of alignment with the passageways 195 and 197 whenever the plate 100 is moved to engaged position, and thus no drift motion takes place, since no fluid can pass through the conduit 198 to the drift clutch 150.

It will be noted in Figures 14 and 15 that a chamber 202 is formed at the end of shaft 102. Hydraulic fluid may enter or leave the chamber 202 only through a transverse passageway 203. The passageway 203 is blocked whenever the pilot valve spool 188 is in its lower position as shown in Figure 14. Thus, due to the incompressibility of hydraulic fluid, the shaft 102; and, hence, the selector plate 100 cannot be moved unless an escape passageway is provided for the fluid in the chamber 202. As can be seen in Figure 15, as soon as the pilot valve spool 188 moves to its uppermost position, a recess 204 therein aligns with the passageway 203 and permits fluid to escape from the chamber 202 through the recess 204 and a transverse and axial passageway 205 in the valve spool 188. Fluid escaping through the passageway 205 is picked up by conduit 206 and returns through the valve 177 (when in the "stop" position) and a return conduit 207 to the pump 178.

It will be noted that, in general, the pilot valve spool 188 is in the "down" position when the transmission is running (see Figure 17). Thus, since the passageway 203 is blocked and fluid cannot escape from the chamber 202, it is impossible to engage the transmission shifting plate by either hydraulic power or manually at a time when the transmission is running.

It will be noted that as the shaft 102 moves upwardly into the chamber 202, it closes the passageway 203 before the end of the chamber 202 is reached. At this time there is still some fluid remaining in the chamber 202, and for that reason an escape valve is provided comprising a plug 208 closely fitting in an aperture 209 in the end of the chamber 202 and mounted on a necked down extension 210 of the shaft 102. Thus, as can be seen in Figure 16, for example, as soon as the end of the shaft 102 has moved upwardly far enough to close the transverse passageway 203, the plug member 208 has moved out of the aperture 209, thus permitting fluid to escape from the chamber 202 around the neck 210.

Returning now to the description of the successive operational diagrams, reference should be had to Figure 17 where it will be seen that the stop-start lever 22 has been moved to "run" position. In this position, fluid under pressure from the conduit 180 is now transferred to the conduit 206 which was previously a return conduit. Thus, fluid under pressure is admitted into a chamber 215 above the pilot valve spindle 188, thereby forcing the same downwardly. Hydraulic fluid in the chamber 216, below the spool 188 escapes relatively slowly through a bleed passageway 217 into a sump (not shown). Due to the time taken for fluid to escape through the bleed passageway 217, the downward movement of the spool 188 is relatively slow, permitting pressurized fluid to pass through the axial passageway 205, the recess 204, and the transverse passageway 203 into the chamber 202 if the shaft 102 is in a retracted position.

It will be obvious, of course, that if the shaft 102 is not in retracted position, the transverse passageway 203 will be blocked and no fluid will pass therethrough. From the foregoing description it will be understood that the transmission and, thus, the spindle may be stopped and started without affecting or changing the setting of the speed selector plate 100. If, however, the selector plate is in a retracted position, the transmission is started by moving the lever 22 to "run" position, the chamber 202 is immediately filled with fluid so as to prevent thereafter either manual or automatic movement of the selector plate while the full power is on the transmission. Thus, damage to the clutches and other transmission elements is prevented.

Again referring to Figure 17, it will be seen that when the lever 22 is moved to the "run" position, the conduit 206, as above stated, becomes the pressure conduit, whereas the previous pressure conduit 181 becomes a return conduit. Thus, the fluid in the brake actuating chamber 165 may escape through the conduit 189, the passageway 185, the passageways 185 and 186, and the recess 187a to the parallel passageway 187 and, hence, through the conduit 181 and 207 back to the pump 178.

As previously stated, it is desired that the brake be quickly released when the transmission is started. For this purpose a branch conduit 220 is connected from the conduit 206 to the release side of the brake piston 166 so that release pressure is applied to the brake as soon as the lever 22 is moved to the "run" position.

The hydraulically actuated main clutch 50 is operated in similar fashion by reason of a branch conduit 221, which delivers pressurized fluid from the conduit 206 through the clutch engaging passageway 172, and at the same time fluid from the back chamber 173 is permitted to escape through the branch conduit 182 and the conduit 181 back to the pump 178.

From the previous description, it will be seen that whenever the lever 22 is in "stop" position, hydraulic pressure is applied to the conduit 181. If, with the transmission in this condition, it is desired to rotate the spindle slowly for purposes of inspection, the same may be accomplished by means of the jog control 27 which, when depressed, moves the spool 27a to a position to admit fluid through the branch conduit 183 and 183a to the drift clutch engaging the same and turning the spindle slowly by means of the drift mechanism previously described. As soon as the jog control 27 is released, moving the spool 27a to close the position by means of a spring 27b, fluid escapes from the drift clutch 150 through the previously described bleed passageway 200, thus releasing the drift clutch and stopping the drift movement of the spindle.

The construction and elements of the present transmission having been described and details of the operation having been described in the course of the previous explanation, it is believed that the over-all operation of the transmission will be apparent. Summarizing such operation, it is as follows:

Assuming the lathe to be in a position of rest, the selector lever 25 is rotated to the desired speed; and, if manual setting is desired, the lever is pushed inwardly (the manual-automatic control 26 being set to the appropriate position) thus moving the transmission clutches into the desired arrangement to provide the desired spindle speed. Thereafter, the stop-start lever 22 is moved to the "run" position which, as previously described, engages the main clutch 50 and rotates the spindle through the transmission.

The manual-automatic control 26 may now be turned to "automatic" position, the selector lever 25 pulled outwardly and rotated to a new desired speed setting without disturbing the then-operation of the spindle.

Thereafter, when the stop-start lever 22 is moved to "stop" position, i. e., the condition shown in Figure 14, the immediate effect is, as previously described, to apply the brake 160, quickly decelerating the spindle. Thereafter, through the automatic operation of the valve 190, fluid is admitted to the fluid chamber below the piston 131, automatically moving the selector plate 100 into its pin-engaging positions, such movement being permitted by the release of fluid from the chamber 202 during the upward movement of the spool 188. The last described upward movement of the spool 188 is automatically affected by pressurized fluid through the passageway 191 into the chamber 192, as previously described. When the spool reaches its uppermost position, the brake pressure is released through the passageway 193, as previously described. During this operation drift movement has been affected by delivery of pressurized fluid through the conduit 198 to the drift clutch 150, as previously described. As soon as the plate 100 has moved inwardly to effect the new arrangement of the transmission clutches, the drift operation ceases, due to the misalignment of the recess 196, as previously described.

When the stop-start lever is again moved to the "run" position, brake releasing fluid is delivered through the conduit 220 effecting a complete and rapid release of the brake, if the same is not already released by the spring 193. Fluid is also delivered to the main clutch 50, engaging the same, and the operations proceed at the new spindle speed.

While the speed-selector lever 25 may be pulled outwardly and rotated to a new speed at any time, it may not be pushed inwardly, due to the trapped fluid in the chamber 202, until the lever 22 has been moved to "stop" position, stopping the rotation of the spindle.

While the embodiment of the invention, illustrated and described herein, is fully capable of achieving the objects and providing the advantages hereinbefore stated, it will be realized that the mechanisms are capable of considerable modification without departure from the spirit of the invention. For this reason we do not mean to be limited to the precise form shown and described, but rather to the scope of the appended claims.

We claim:

1. A speed-changing transmission for a machine tool having a frame, a power-driven input and a spindle, comprising: a gear train interposed between said input and said spindle; a plurality of clutches for selectively interconnecting the gears of said gear train so as to vary the speed of said spindle; force-transfer means supported on said frame and operatively connected to said clutches for selectively engaging any desired number thereof; a pin body on said frame; a plurality of selector pins supported for axial movement in said pin body, one end of said selector pins being operatively connected to said force-transfer means whereby the axial position of said pins will control the movement of said force-transfer means; a shaft supported in said frame for selective axial and rotational movement therein; a selector plate keyed to said shaft and movable upon axial movement of said shaft toward and away from said pin body, said selector plate being formed with a pattern of apertures to receive certain of said selector pins when said selector plate is adjacent said pin body so as to vary the axial positions of said pins, the rotational position of said plate relative to said frame determining which of said selector pins will enter said apertures when said selector plate is moved to a position adjacent said pin body; and unitary handle means on said shaft for effecting selectively, said rotation or said axial movement thereof.

2. A speed-changing transmission as set forth in claim 1 wherein said shaft is keyed to a dial for axial movement relative thereto, said dial being rotatably supported by said frame, and said handle means includes a lever secured to said dial with said lever being operatively connected to said shaft so as to effect both the axial movement thereof and the rotation of said dial.

3. A speed-changing transmission as set forth in claim 2 wherein one end of said lever is pivotally secured to a portion of said dial offset from the latter's center for movement in a direction toward and away from said pin body, and the intermediate portion of said lever is connected to said shaft.

4. A speed-changing transmission for a machine tool having a frame, a power-driven input and a spindle, comprising: a gear train interposed between said input and said spindle; a plurality of clutches for selectively interconnecting the gears of said gear train so as to vary the speed of said spindle; longitudinally movable rod means supported on said frame and operatively connected to said clutches for selectively engaging any desired number thereof; a pin body fixed to said frame; a plurality of rocker members pivotally supported by said frame adjacent said pin body, said rocker members being connected to said rod means so as to effect longitudinal movement thereof; a plurality of selector pins supported for axial movement in said pin body, one end of said selector pins being engageable with said rocker members whereby the axial position of said pins will determine the positions of said rocker members; and a selector plate rotatably supported by said frame and movable toward and away from said pin body, said selector plate being formed with a pattern of apertures to receive said selector pins when said selector plate is adjacent said pin body so as to vary the axial positions of said pins, the rotational position of said plate relative to said frame determining which of said selector pins will enter said apertures when said selector plate is moved to a position adjacent said pin body, said selector plate being secured to a shaft carried by said frame and operatively connected to a manually controlled spindle speed selecting lever, and spindle speed indicia provided for said lever; said shaft being keyed to a dial for axial movement relative thereto, said dial being rotatably supported by said frame, and said lever is secured to said dial with said lever being operatively connected to said shaft so as to effect both the axial movement thereof and the rotation of said dial.

5. A speed-changing transmission as set forth in claim 4 wherein one end of said lever is pivotally secured to a portion of said dial offset from the latter's center for movement in a direction toward and away from said pin body, and the intermediate portion of said lever is connected to said shaft.

6. A speed-changing transmission for a machine tool having a frame, a power-driven input and a spindle, comprising: a gear train interposed sequentially between said input and said spindle; a plurality of clutches interposed between said gears and selectively engageable so as to vary the speed of said spindle, each of said clutches having two complementary rotatable members which are urged into driving contact; selector means on said frame operatively connected to said clutches for selectively and successively engaging in a predetermined order any desired number thereof; and a selectively operable drift clutch interposed between said input and the first of said clutches engaged by said selector means to effect slow rotation of one of the two members of each of said clutches at the time of engagement thereof.

7. A speed-changing transmission for a machine tool having a frame, a power-driven input and a spindle, comprising: a plurality of shafts including a high speed shaft connected to said input, a low speed shaft connected to said spindle and one or more intermediate speed shafts; a plurality of gears on said shafts cooperating to define a gear train between said input shaft and said spindle, certain gears on each shaft being free turning thereon and every gear being constantly meshed with a gear on another shaft; a plurality of clutches interposed between said free turning gears and their respective shafts and engageable to selectively couple said free turning gears to said shafts so as to vary the speed of said spindle, each of said clutches having two complementary rotatable members which are urged into driving contact; and a selectively operable drift clutch interposed between said input and the fastest of said intermediate speed shafts to effect slow rotation of one of the two members of each of said clutches at the time it is engaged.

8. A speed-changing transmission for a machine tool having a frame, a power-driven input and a spindle, comprising: a main clutch connected to said input; a gear train interposed between said main clutch and said spindle; shifting means for said gear train to vary the speed of said spindle; changeover control means operatively connected to said shifting means for preselecting a new spindle speed before said shifting means effects such speed change; a spindle brake; means to automatically disengage said main clutch and apply said spindle brake after said changeover control means has selected a new spindle speed but before said shifting means can effect such speed change; and means to release said brake a relatively short time after said application thereof and before operation of said shifting means whereby to leave said spindle free to turn during operation of said shifting means.

9. A speed-changing transmission for a machine tool having a frame, a power-driven input and a spindle, comprising: a main clutch connected to said input; a gear train interposed between said main clutch and said spindle; a plurality of clutches for selectively interconnecting the gears of said gear train so as to vary the speed of said spindle; selector means on said frame operatively connected to said clutches for selectively engaging any desired member thereof; changeover control means operatively connected to said selector means for preselecting the next setting thereof without disturbing the existing setting thereof; a spindle brake; means to automatically disengage said main clutch and apply said spindle brake after said changeover control means has preselected the next setting of said selector means but before said selector means can operate said clutches; and means to release said brake a relatively short time after said application thereof and before operation of said shifting means whereby to leave said spindle free to turn during operation of said shifting means.

10. A speed-changing transmission for a machine tool having a frame, a power-driven input shaft and a spindle, comprising: a main clutch connected to said input shaft; a plurality of additional shafts on said frame; a plurality of gears on said shafts cooperating to define a gear train between said input shaft and said spindle, certain gears on each shaft being free-turning and being constantly meshed with gears on other shafts; a plurality of clutches interposed between said free-turning gears and their respective shafts and operable to selectively couple said gears to said shafts so as to vary the speed of said spindle; selector means on said frame operatively connected to said clutches for selectively engaging any desired member thereof; changeover control means operatively connected to said selector means for preselecting the next setting thereof without disturbing the existing setting thereof; a spindle brake; and means to automatically disengage said main clutch and momentarily apply said spindle brake after said changeover control means has preselected the next setting of said selector means but before said selector means can operate said clutches whereby to stop said spindle and leave the same free to turn during operation of said clutches.

11. A speed-changing transmission for a machine tool having a frame, a power-driven input and a spindle, comprising: a main clutch connected to said input; a gear train interposed between said main clutch and said spindle; a plurality of clutches for selectively interconnecting the gears of said gear train so as to vary the speed of said spindle; force-transfer means supported on said frame and operatively connected to said clutches for selectively engaging any desired number thereof; a pin body on said frame; a plurality of selector pins supported for axial movement in said pin body, one end of said selector pins being operatively connected to said force-transfer means whereby the axial position of said pins will control the movement of said force-transfer means; a selector plate rotatably supported by said frame and movable toward and away from said pin body, said selector plate being formed with a pattern of apertures to receive said selector pins when said selector plate is adjacent said pin body so as to vary the axial positions of said pins, the rotational position of said plate relative to said frame determining which of said selector pins will enter said apertures when said selector plate is moved to a position adjacent said pin body, and said selector plate being moved away from said pin body in order that it may be rotated to a new setting; a spindle brake; and means to automatically disengage said main clutch and apply said spindle brake after said selector plate has been rotated to a new setting but before it may be returned to a position adjacent said pin body.

12. A speed-changing transmission for a machine tool having a frame, a power-driven input and a spindle, comprising: a main clutch connected to said input; a gear train interposed between said main clutch and said spindle; a plurality of clutches for selectively interconnecitng the gears of said gear train so as to vary the speed of said spindle; longitudinally movable rod means supported on said frame and operatively connected to said clutches for selectively engaging any desired number thereof; a pin body fixed to said frame; a plurality of rocker members pivotally supported by said frame adjacent said pin body, each of said rocker members being connected to one of said rod means so as to effect the longitudinal movement thereof; a plurality of selector pins supported for axial movement in said pin body, one end of said selector pins being operatively connected to said rocker members whereby the axial position of said pins will determine the positions of said rocker members; a selector plate rotatably supported by said frame and movable toward and away from said pin body, said selector plate being formed with a pattern of apertures to receive said selector pins when said selector plate is adjacent said pin body so as to vary the axial positions of said pins, the rotational position of said plate relative to said frame determining which of said selector pins will enter said apertures when said selector plate is moved to a position adjacent said pin body, and said selector plate being moved away from said pin body in order that it may be rotated to a new setting; a spindle brake; and means to automatically disengage said main clutch and apply said spindle brake after said selector plate has been rotated to a new setting but before it may be returned to a position adjacent said pin body.

13. A speed-changing transmission for a machine tool having a frame, a power-driven input and a spindle, comprising: gearing interposed between said main clutch and said spindle; shifting means for said gearing to vary the speed of said spindle; changeover control means operatively connected to said shifting means for preselecting a new spindle speed before said shifting means effects such speed change, said changeover control means including a selector plate which is manually rotated to preselect a new spindle speed and which is moved axially under fluid pressure to cause said shifting means to vary the setting of said gear train, said selector plate being disposed in a fluid chamber; valve means in communication with said chamber, said valve means admitting fluid pressure thereinto when exposed to a predetermined fluid pressure; a source of pressurized fluid; a control valve connected to said source; a fluid-operated spindle brake; and conduit means interconnecting said control valve with said fluid chamber and with said brake whereby after said brake has been applied the fluid pressure in said conduit means will build up to said predetermined pressure.

14. A speed-changing transmission for a machine tool having a frame, a power-driven input and a spindle, comprising: a fluid-operated main clutch connected to said input; a gear train interposed between said main clutch and said spindle; shifting means for said gear train to vary the speed of said spindle; changeover control means operatively connected to said shifting means for preselecting a new spindle speed before said shifting means effects such speed change, said changeover control means including a selector plate which is manually rotated to preselect a new spindle speed and which is moved axially under fluid pressure in order to cause said shifting means to vary the setting of said gear train, said selector plate being disposed in a fluid chamber; valve means in communication with said chamber, said valve means admitting fluid pressure to said fluid chamber when acted upon by a predetermined fluid pressure; a source of pressurized fluid; a control valve connected to said source; a fluid-operated spindle brake; and conduit means interconnecting said control valve with said clutch, said brake and said valve means, the fluid pressure in said conduit means reaching said predetermined value only after said main clutch has been disengaged and said spindle brake has been engaged.

15. A speed-changing transmission for a machine tool having a frame; a power-driven input and a spindle, comprising: a gear train interposed between said input and said spindle; a plurality of clutches interposed between said gears and selectively engageable so as to vary the speed of said spindle, each of said clutches having two complementary rotatable members which are urged into driving contact; a selectively operable drift clutch interposed between said input and said clutches to effect constant slow rotation of one of said two rotatable members with respect to the other in each of said clutches at the time said clutch is engaged; a main clutch connected to said input; shifting means for operating said plurality of clutches so as to vary the speed of said spindle; changeover control means operatively connected to said shifting means for preselecting a new spindle speed before said shifting means effects such speed change; a spindle brake; and servo control means including a manual controller and connected to said main clutch, to said spindle brake, to said drift clutch, and to said changeover control means, adapted when said controller is operated to actuate said elements to which it is connected in predetermined sequence, to wit, to first operate said changeover means to select a new spindle speed, to then disengage said main clutch, apply said spindle brake, and engage said drift clutch, and then to actuate said shifting means to effect said new spindle speed.

16. A speed-changing transmission for a machine tool having a frame, a power-driven input shaft and a spindle, comprising: a plurality of shafts including a high speed shaft connected to said input shaft, a low speed shaft connected to said spindle and one or more intermediate speed shafts; a plurality of gears on said shafts cooperating to define a gear train between said input shaft and said spindle, certain gears on each shaft being free turning thereon and each gear being constantly meshed with a gear on another shaft; a plurality of two-member clutches interposed between said free turning gears and their respective shafts and engageable to selectively couple said free turning gears to said shafts so as to vary the speed of said spindle; shifting means for engaging said plurality of clutches so as to vary the speed of said spindle, said clutches being engaged by said shifting means in predetermined sequence with the clutch on the fastest of said intermediate speed shafts being engaged first; a selectively operable drift clutch interposed between said input shaft and said fastest shaft, said drift clutch when engaged effecting constant slow rotation of the latter shaft and hence relative rotation between the two members of each of said clutches at the time such clutch is engaged; changeover control means operatively connected to said shifting means for preselecting a new spindle speed before said shifting means effects such speed change; a spindle brake; and means that automatically disengages said main clutch, applies said spindle brake and engages said drift clutch after said changeover control means has selected a new spindle speed but before said shifting means can select such speed change.

17. A speed-changing transmission for a machine tool having a frame, a power-driven input and a spindle, comprising: gearing between said input and said spindle; a fluid-operated main clutch for said gearing; shifting means for said gearing; a fluid-operated spindle brake; a source of pressurized fluid; a body formed with a fluid-receiving selector member chamber and a fluid-receiving pilot valve chamber; a selector member operatively connected to said shifting means and axially slidably disposed in said selector member chamber, said selector member being manually rotatable while disposed in a first axial position to preselect the next spindle speed to be provided by said shifting means and being axially movable to a second axial position wherein it actuates said shifting means when said selector member chamber is vented; a control valve connected to said source; venting means for said selector member chamber; a pilot valve element in said pilot valve chamber movable between a first position wherein it covers said venting means and a second position wherein said venting means is uncovered, said pilot valve element remaining in its first position until said pilot valve chamber is subjected to a predetermined fluid pressure whereupon said pilot valve element will move to its second position; and conduit means effecting communication between said control valve, said spindle brake, said main clutch and said pilot valve chamber, the introduction of pressurized fluid to said conduit means effecting disengagement of said main clutch and the application of said spindle brake whereafter the pressure within said conduit means will rise to said predetermined value.

18. A speed-changing transmission as set forth in claim 17 wherein movement of said pilot valve element to its second position effects the release of said spindle brake and the application of said main clutch.

19. A speed-changing transmission as set forth in claim 17 wherein said pilot valve element includes a spool axially slidably disposed in said pilot valve chamber for movement between its first and second positions, said spool having a land that blocks said venting means in said first position.

20. A speed-changing transmission for a machine tool having a frame, a power-driven input and a spindle, comprising: a gear train between said input and said spindle; a plurality of intermediate clutches interposed between said gears and selectively and sequentially engageable so as to vary the speed of said spindle, each of said clutches having two complementary rotatable members which are urged into driving contact; a selectively engageable fluid-operated drift clutch interposed between said input and the first of said intermediate clutches to be engaged to effect slow rotation of one of the two rotatable members with respect to the other in each of said clutches at the time it is engaged; a fluid-operated main clutch interposed between said input and said gear train; a fluid-operated spindle brake; a source of pressurized fluid; a body formed with a fluid-receiving selector member chamber and a fluid-receiving pilot valve chamber; a selector member operatively connected to said intermediate clutches and axially slidably disposed in said selector member chamber, said selector member being manually rotatable while disposed in a first axial position to preselect the next spindle speed to be provided by said gear train and being axially movable to a second axial position wherein it selectively engages said intermediate clutches when said selector member chamber is vented; a control valve connected to said source; venting means for said selector member chamber; a pilot valve element in said pilot valve chamber movable between a first position wherein it covers said venting means and a second position wherein said venting means is uncovered, said pilot valve element remaining in its first position until said pilot valve chamber is subjected to a predetermined fluid pressure whereupon said pilot valve element will move to its second position; conduit means effecting communication between said control valve, said spindle brake, said main clutch and said pilot valve chamber, the introduction of pressurized fluid to said conduit means effecting disengagement of said main clutch and the application of said spindle brake whereafter the pressure within said conduit means will rise to said predetermined value; second conduit means connecting said drift clutch with said conduit means; and valve means cooperating with said second conduit means to effect engagement of said drift clutch when the pressure in said conduit means rises to said predetermined value, said valve means effecting release of said drift clutch as said selector member moves from its first to its second position.

21. A speed-changing transmission as set forth in claim 20 wherein movement of said pilot valve element to its second position effects the release of said spindle brake and the application of said main clutch.

22. A speed-changing transmission as set forth in claim 20 wherein said pilot valve element includes a spool axially slidably disposed in said pilot valve chamber for movement between its first and second positions, said spool having a land that blocks said venting means in said first position.

23. A speed-changing transmission as set forth in claim 20 wherein branch conduit means are provided between said source of pressurized fluid and said drift clutch and a manually operated jog control is interposed in said branch conduit for effecting temporary engagement of said drift clutch even though said selector member is disposed in its second position whereby to rotate said spindle at a relatively slow speed.

24. A speed-changing transmission for a machine tool having a frame, a power-driven input and a spindle, comprising: a plurality of shafts including a high speed shaft connected to said input, a low speed shaft connected to said spindle and one or more intermediate speed shafts; a plurality of gears on said shafts cooperating to define a gear train between said input shaft and said spindle, certain gears being free turning on their respective shafts and each gear being constantly meshed with a gear on another shaft; a plurality of intermediate clutches interposed between said free turning gears and their respective shafts and engageable to selectively couple said free turning gears to said shafts so as to vary the speed of said spindle, each of said clutches having a pair of complementary rotatable members which are urged into driving contact; a selectively engageable fluid-operated drift clutch interposed between said input and the fastest of said intermediate speed shafts to effect constant slow rotation thereof; a fluid-operated main clutch interposed between said input and said gear train; a fluid-operated spindle brake; a source of pressurized fluid; a body formed with a fluid-receiving selector member chamber and a fluid-receiving pilot valve chamber; a selector member operatively connected to said intermediate clutches and axially slidably disposed in said selector member chamber, said selector member being manually rotatable while disposed in a first axial position to preselect the next spindle speed to be provided by said gear train and being axially movable to a second axial position wherein it selectively engages said intermediate clutches in predetermined sequence when said selector member chamber is vented the clutch on the fastest shaft being the first so engaged whereby said drift clutch effects slow relative rotation of each of said pairs of rotatable clutch members at the time of engagement thereof; a control valve connected to said source; venting means for said selector member chamber; a pilot valve element in said pilot valve chamber movable between a first position wherein it covers said venting means and a second position wherein said venting means is uncovered, said pilot valve element remaining in its first position until said pilot valve chamber is subjected to a predetermined fluid pressure whereupon said pilot valve element will move to its second position; conduit means effecting communication between said control valve, said spindle brake, said main clutch and said pilot valve chamber, the introduction of pressurized fluid to said conduit means effecting disengagement of said main clutch and the application of said spindle brake whereafter the pressure within said conduit means will rise to said predetermined value; second conduit means connecting said drift clutch with said conduit means; and valve means cooperating with said second conduit means to effect engagement of said drift clutch when the pressure in said conduit means rises to said predetermined value, said valve means effecting release of said drift clutch as said selector member moves from its first to its second position.

25. A speed-changing transmission as set forth in claim 24 wherein movement of said pilot valve element to its second position effects the release of said spindle brake and the application of said main clutch.

26. A speed-changing transmission as set forth in claim 24 wherein said pilot valve element includes a spool axially slidably disposed in said pilot valve chamber for movement between its first and second positions, said spool having a land that blocks said venting means in said first position.

27. A speed-changing transmission as set forth in claim 24 wherein branch conduit means are provided between said source of pressurized fluid and said drift clutch and a manually operated jog control is interposed in said branch conduit for effecting temporary engagement of said drift clutch even though said selector member is disposed in its second position whereby to slowly rotate said spindle.

28. A speed-changing transmission for a machine tool having a frame, a power-driven input and a spindle, comprising: gearing between said input and said spindle; a fluid-operated main clutch for said gearing; shifting means for said gearing; force-transfer means supported on said frame and operatively connected to said shifting means for effecting a change in spindle speed; a pin body on said frame; a plurality of selector pins supported for axial movement in said pin body, said selector pins being operatively connected to said force-transfer means whereby the axial position of said pins will control the movement of said force-transfer means; a second body on said frame formed with a fluid-receiving selector plate chamber and a fluid-receiving pilot valve chamber; a selector plate rotatably and axially disposed within said selector plate chamber and axially movable between a first position remote from said pin body and a second position proximate said pin body, the rotational position of said plate determining which of said selector pins will enter said apertures when said plate is moved axially to its second position, and said selector plate being manually rotatable while disposed in its first position to preselect the next spindle speed to be provided by said shifting means; a fluid operated spindle brake; a source of pressurized fluid; a control valve connected to said source; venting means for said selector member chamber; a pilot valve element in said pilot valve chamber movable between a first position wherein it blocks said venting means and a second position wherein said venting means is unblocked, said pilot valve element remaining in its first position until said pilot valve chamber is subjected to a predetermined fluid pressure whereupon said pilot valve element will move to its second position; and conduit means effecting communication between said control valve, said spindle brake, said main clutch and said pilot valve chamber, the introduction of pressurized fluid to said conduit means by said control valve effecting disengagement of said main clutch and the application of said spindle brake whereafter the pressure within said conduit means will automatically rise to said predetermined value.

29. A speed-changing transmission as set forth in claim 28 wherein movement of said pilot valve element to its second position effects the release of said spindle brake and the application of said main clutch.

30. A speed-changing transmission as set forth in claim 28 wherein said pilot valve element includes a spool axially slidably disposed in said pilot valve chamber for movement between its first and second positions, said spool having a land that blocks said venting means in said first position.

31. A speed-changing transmission as set forth in claim 28 wherein said selector plate is secured to a shaft carried by said frame and operatively connected to a manually controlled spindle speed selecting lever, and spindle speed indicia are provided for said lever.

32. A speed-changing transmission as set forth in claim 31 wherein said shaft is keyed to a dial for axial movement relative thereto, said dial being rotatably supported by said frame, and said lever is secured to said dial with said lever being operatively connected to said shaft so as to effect both the axial movement thereof and the rotation of said dial.

33. A speed-changing transmission as set forth in claim 32 wherein one end of said lever is pivotally secured to a portion of said dial offset from the latter's center for movement in a direction toward and away from said pin body, and the intermediate portion of said lever is connected to said shaft.

34. In a machine tool speed-changing transmission of the type having a plurality of selectively engageable gear train elements adapted to be engaged in various combinations to effect various input-output speed ratios in said transmission, a speed selector and changeover mechanism comprising: a frame; a bank of rocker arms mounted in said frame, each being linked to a respective one of said gear train elements to cause engagement of the same when rocked; a selector plate mounted in said frame for rotation therein and for axial movement therein toward and away from said bank of rocker arms, said plate having a predetermined pattern of apertures formed therein facing said bank of rocker arms; a plurality of pins all parallel to the direction of axial movement of said plate and interposed between said plate and rocker arms, each pin being positioned to engage an end of one of said rocker arms to rock the same in response to axial movement of said plate toward said arms unless one of said apertures underlies such pin; handle means connected to said plate to rotate the same to bring various apertures under various pins and to move said plate axially to rock certain selected rocker arms according to the pattern aperture then underlying said pins; and stop means associated with said plate and frame to positively prevent said axial movement of said plate, except when said plate is in certain predetermined rotational positions with selected apertures underlying selected pins.

35. In a machine tool speed-changing transmission of the type having a plurality of selectively engageable gear train elements adapted to be engaged in various combinations to effect various input-output speed ratios in said transmission, a speed selector and changeover mechanism comprising: a frame; a shaft journaled in said frame and adapted for rotation and axial sliding movement therein; a bank of rocker arms in said frame, each mounted therein on a rock axis substantially transverse to the axis of said shaft, each rocker arm being linked to one of said gear train elements to cause engagement of the same when rocked; a selector plate keyed to said shaft to be rotated thereby and to be moved axially thereby toward and away from said bank of rocker arms, said blade having a predetermined pattern of apertures formed therein facing said bank of rocker arms; a plurality of pins all parallel to the direction of axial movement of said shaft and interposed between said plate and rocker arms, each pin being positioned to engage one end of one of said arms to rock the same in response to axial movement of said shaft and plate toward said arms unless one of said apertures underlies such pin; and a single handle secured to said shaft to rotate the same to bring various apertures under various pins and also to move said shaft and hence said plate toward said rocker arms to rock said certain rocker arms according to the particular apertures then underlying said pins.

36. The construction of claim 35 further characterized by having a dial rotationally secured to said shaft but axially slidable with respect thereto, said dial being rotatably supported in said frame and constrained against axial movement therein and having indicia thereon to indicate the rotative position of said shaft and plate at all times.

37. The construction of claim 36 further characterized by having a lever for said handle pivotally secured to said dial on a pivot axis transverse to, and spaced from said shaft axis, said lever being connected to said shaft to effect said axial movement of the latter upon swinging of said lever about said pivot axis.

38. The construction of claim 35 further characterized by having stop means associated with said plate and frame to positively prevent said axial movement of said plate except when said plate is in certain predetermined rotational positions with selected apertures underlying said pins.

References Cited in the file of this patent
UNITED STATES PATENTS

| | | |
|---|---|---|
| 1,938,319 | Conley | Dec. 5, 1933 |
| 2,429,160 | Helmstein et al. | Oct. 14, 1947 |
| 2,465,942 | Sundt | Mar. 29, 1949 |

UNITED STATES PATENT OFFICE
CERTIFICATE OF CORRECTION

Patent No. 2,873,613                                  February 17, 1959

Clifford L. Schulte et al.

It is hereby certified that error appears in the printed specification of the above numbered patent requiring correction and that the said Letters Patent should read as corrected below.

Column 19, line 13, for "select" read -- effect --.

Signed and sealed this 9th day of June 1959.

(SEAL)

Attest:

KARL H. AXLINE                                        ROBERT C. WATSON
Attesting Officer                                      Commissioner of Patents